US012651223B2

(12) United States Patent
　　Suri

(10) Patent No.:　US 12,651,223 B2
(45) Date of Patent:　Jun. 9, 2026

(54) USER INTERFACE JOURNEY EXPERIENCE CONTROLLER—END-TO-END (E2E) ORCHESTRATION

(71) Applicant: Telefonaktiebolaget LM Ericsson (publ), Stockholm (SE)

(72) Inventor: Jatin Suri, Waterdown (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 228 days.

(21) Appl. No.: 18/567,185

(22) PCT Filed: Jun. 9, 2022

(86) PCT No.: PCT/IB2022/055383
　　§ 371 (c)(1),
　　(2) Date: Dec. 5, 2023

(87) PCT Pub. No.: WO2022/263979
　　PCT Pub. Date: Dec. 22, 2022

(65) Prior Publication Data
　　US 2024/0273435 A1　　Aug. 15, 2024

Related U.S. Application Data

(60) Provisional application No. 63/210,937, filed on Jun. 15, 2021.

(51) Int. Cl.
　　*G06Q 10/0633*　　(2023.01)
　　*G06F 9/451*　　(2018.01)
　　*G06Q 30/0601*　　(2023.01)

(52) U.S. Cl.
　　CPC ......... *G06Q 10/0633* (2013.01); *G06F 9/451* (2018.02); *G06Q 30/0633* (2013.01)

(58) Field of Classification Search
　　CPC ........... G06Q 10/0633; G06Q 30/0633; G06Q 30/06; G06F 9/451
　　　　　　(Continued)

(56) References Cited

U.S. PATENT DOCUMENTS 6,321,133 B1 * 11/2001 Smirnov .......... G06Q 10/06316
　　　　　　　　　700/100
2006/0200767 A1 9/2006 Glaeske et al.
　　　　　　(Continued)

FOREIGN PATENT DOCUMENTS

WO　　2022123291 A1　6/2022

OTHER PUBLICATIONS

Jiří "The Adoption of Business Process Management in Small and Medium", Nov. 2014, Masaryk University Faculty of Informatics, pp. 1-160. (Year: 2014).*

(Continued)

*Primary Examiner* — Romain Jeanty
(74) *Attorney, Agent, or Firm* — Murphy, Bilak & Homiller, PLLC

(57) ABSTRACT

Embodiments include methods performed by a controller application executing on a computing node, for controlling UI transitions based on a Business Process Model and Notation (BPMN) UI flow. Such methods include transmitting, to a UI application, a first message including a first flow object of the BPMN UI flow. The first flow object includes a first page definition defining a first page for rendering by the UI application, and one or more first action definitions representing one or more first actions to be rendered within the first page. Such methods include receiving from the UI application a second message indicating a selected one of the first actions and, based upon the selected first action, requesting a first operation of the BPMN UI flow from an external service. Other embodiments include complemen-
(Continued)

tary methods for a UI application, as well as computing nodes and communication devices configured to perform such methods.

21 Claims, 16 Drawing Sheets

(58) Field of Classification Search
USPC ........................................................ 705/3–44
See application file for complete search history.

(56) References Cited

U.S. PATENT DOCUMENTS

| | | | | |
|---|---|---|---|---|
| 2011/0066565 A1* | 3/2011 | Day | ...................... | G06Q 10/06 |
| | | | | 705/348 |
| 2013/0238384 A1* | 9/2013 | Caesar | ...................... | G06F 8/34 |
| | | | | 705/7.27 |
| 2016/0342897 A1* | 11/2016 | Helfman | ............... | G06F 3/0482 |
| 2016/0350160 A1* | 12/2016 | Hamway | ............. | H04L 41/0806 |
| 2018/0081642 A1 | 3/2018 | Alurralde Iturri et al. | | |
| 2019/0147390 A1* | 5/2019 | Subramanian | ............................... | |
| | | | | G06Q 10/063116 |
| | | | | 705/7.22 |
| 2020/0202273 A1 | 6/2020 | Lehmann et al. | | |

OTHER PUBLICATIONS

Kate "Beginer's Guide to Business Process Modeling and Notation (BPMN)", Nov. 2016, Business Process Management, pp. 1-14 (Year: 2016).*

Mohan, Rakesh, et al., "A State Machine Based Approach for a Process Driven Development of Web-Applications", Electronic Publishing, Artistic Imaging, and Digital Typography; Lecture Notes in Computer Science, vol. 2348, XP002296177, Jan. 1, 2022, pp. 52-66.

* cited by examiner

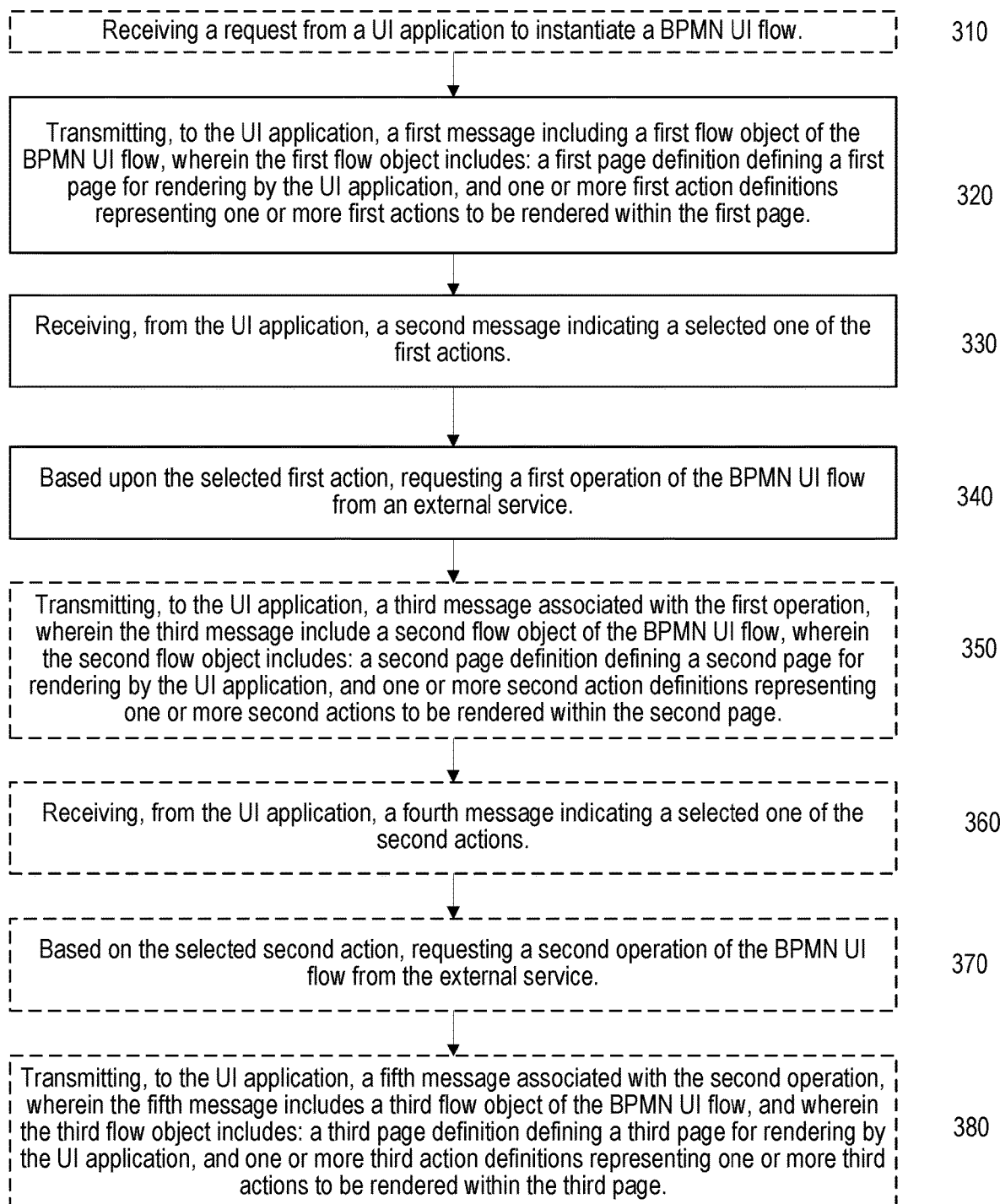

Receiving a request from a UI application to instantiate a BPMN UI flow.          310

Transmitting, to the UI application, a first message including a first flow object of the BPMN UI flow, wherein the first flow object includes: a first page definition defining a first page for rendering by the UI application, and one or more first action definitions representing one or more first actions to be rendered within the first page.          320

Receiving, from the UI application, a second message indicating a selected one of the first actions.          330

Based upon the selected first action, requesting a first operation of the BPMN UI flow from an external service.          340

Transmitting, to the UI application, a third message associated with the first operation, wherein the third message include a second flow object of the BPMN UI flow, wherein the second flow object includes: a second page definition defining a second page for rendering by the UI application, and one or more second action definitions representing one or more second actions to be rendered within the second page.          350

Receiving, from the UI application, a fourth message indicating a selected one of the second actions.          360

Based on the selected second action, requesting a second operation of the BPMN UI flow from the external service.          370

Transmitting, to the UI application, a fifth message associated with the second operation, wherein the fifth message includes a third flow object of the BPMN UI flow, and wherein the third flow object includes: a third page definition defining a third page for rendering by the UI application, and one or more third action definitions representing one or more third actions to be rendered within the third page.          380

FIG. 3

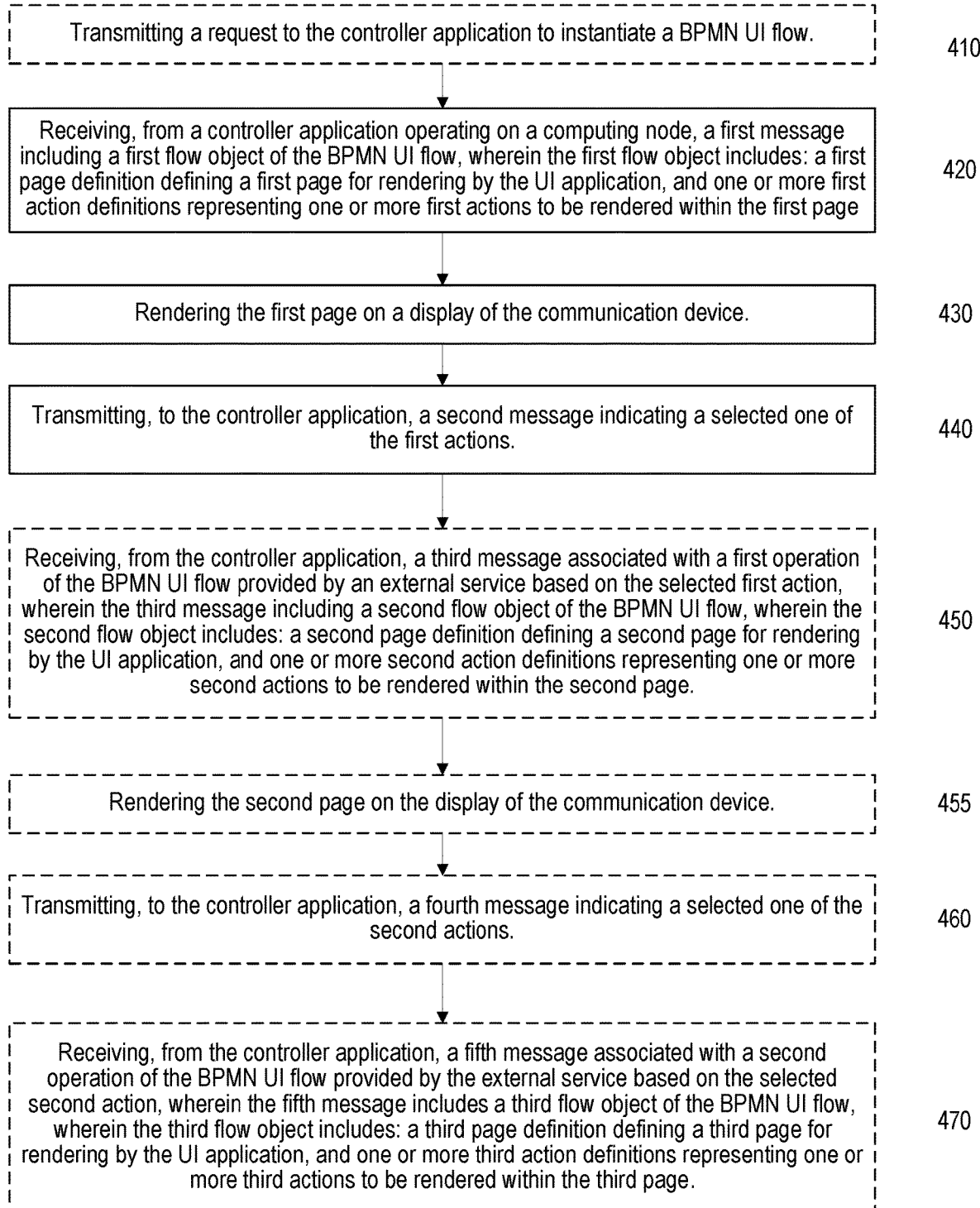

Transmitting a request to the controller application to instantiate a BPMN UI flow.        410

Receiving, from a controller application operating on a computing node, a first message including a first flow object of the BPMN UI flow, wherein the first flow object includes: a first page definition defining a first page for rendering by the UI application, and one or more first action definitions representing one or more first actions to be rendered within the first page        420

Rendering the first page on a display of the communication device.        430

Transmitting, to the controller application, a second message indicating a selected one of the first actions.        440

Receiving, from the controller application, a third message associated with a first operation of the BPMN UI flow provided by an external service based on the selected first action, wherein the third message including a second flow object of the BPMN UI flow, wherein the second flow object includes: a second page definition defining a second page for rendering by the UI application, and one or more second action definitions representing one or more second actions to be rendered within the second page.        450

Rendering the second page on the display of the communication device.        455

Transmitting, to the controller application, a fourth message indicating a selected one of the second actions.        460

Receiving, from the controller application, a fifth message associated with a second operation of the BPMN UI flow provided by the external service based on the selected second action, wherein the fifth message includes a third flow object of the BPMN UI flow, wherein the third flow object includes: a third page definition defining a third page for rendering by the UI application, and one or more third action definitions representing one or more third actions to be rendered within the third page.        470

To/from Fig. 8B contextData
transientContextData

USER INTERFACE JOURNEY EXPERIENCE CONTROLLER—END-TO-END (E2E) ORCHESTRATION

TECHNICAL FIELD

The present disclosure relates to providing user interfaces, and in particular to techniques for customizing and controlling user interface (UI) transitions.

BACKGROUND

Conventional techniques for providing, developing, and/or creating user interfaces (UIs) enable a high degree of usability combined with refined user interface design. Users of commercial products that provide UIs expect such products to enable a significant degree of customization to allow built-in generic functionality to be augmented with customer- and project-specific requirements. In particular, the ability to modify UI page transitions at run-time and to add supporting logic such as validation and communication with external systems, without changing the UI code, is generally considered extremely valuable.

Often it is desirable to utilize a UI to allow a user to interact with an external system or other entity to perform a function associated with a business model, such as allowing a user to shop for products with an online retailer. Conventional solutions for developing UIs attempt to provide the desired level of customization based on tools that produce configuration code, which is then interpreted by UIs. In some instances, tools known as code generators may generate UI source code based on definitions. Many conventional solutions rely on proprietary technology (e.g., tools), which may be difficult to maintain due to the wide range of possibilities for customizing the UI page transitions and interactions with external systems. Furthermore, UI code generated by these tools may be impossible to modify without using them. However, such proprietary tools may be unable to anticipate all possible UI transitions use cases, configurations, and scenarios that a UI may need for a given business model.

In addition to the complexity, there may be a prohibitive cost (e.g., with respect to development lifecycle and maintenance efforts) in developing such solutions based on existing code generators and/or interpreters of declarative UIs. Moreover, the inability to support customer-specific use cases may result in additional costs that may be difficult to foresee.

SUMMARY

Conventional user interface design is often encumbered by complex business logic which is required to be implemented in a UI layer that details the interactions with various downstream systems. Often those interactions are complicated and may vary between implementations. For example, when UIs are for devices used in telecommunication networks, the related ecosystems for the devices may vary considerably across networks and/or network operators. Moving the complex logic to another layer and having the ability to modify the sequence of interactions without affecting the UI is very desirable.

Embodiments disclosed herein include methods and apparatuses for controlling UI transitions based on Business Process Model and Notation (BPMN) UI flows. Disclosed embodiments address various problems, issues, and/or difficulties with conventional techniques, such as those summarized above and described in more detail herein.

Some embodiments include methods (e.g., procedures) for controlling UI transitions based on a BPMN UI flow. These exemplary methods can be performed by a controller application or a computing node hosting such a controller application.

These exemplary methods can include transmitting, to a UI application communicatively coupled to the controller application (e.g., via a communication device), a first message including a first flow object of the BPMN UI flow. The first flow object includes the following: a first page definition defining a first page for rendering by the UI application, and one or more first action definitions representing one or more first actions to be rendered within the first page. These exemplary methods can also include receiving, from the UI application, a second message indicating a selected one of the first actions and, based upon the selected first action, requesting a first operation of the BPMN UI flow from an external service.

In some embodiments, these exemplary methods can also include receiving a request from the UI application to instantiate the BPMN UI flow. In such case, transmitting the first message is responsive to receiving the request.

In some embodiments, these exemplary methods can also include transmitting, to the UI application, a third message associated with the first operation. The third message includes a second flow object of the BPMN UI flow. The second flow object includes the following: a second page definition defining a second page for rendering by the UI application, and one or more second action definitions representing one or more second actions to be rendered within the second page. In such embodiments, these exemplary methods can also include receiving from the UI application a fourth message indicating a selected one of the second actions and, based on the selected second action, request a second operation of the BPMN UI flow from the external service.

In some embodiments, the external service is a shopping cart service, the first operation creates a user shopping cart with the shopping cart service, and the second operation adds a user-selected item to the user shopping cart.

In some embodiments, these exemplary methods can also include transmitting to the UI application a fifth message associated with the second operation. The fifth message includes a third flow object of the BPMN UI flow. The third object flow includes the following: a third page definition defining a third page for rendering by the UI application, and one or more third action definitions representing one or more third actions to be rendered within the third page.

In some embodiments, the UI application is associated with one of the following: a voice response system, a message processing system, or a web graphical user interface (GUI). In some embodiments, requesting the first operation from the external service is performed by a BPMN process engine. In some variants, the BPMN engine is integrated with the controller application.

In some embodiments, the first flow object includes at least one of the following associated with the BPMN UI flow: a flow identifier, a business key, a specification, a flow channel, and an actor. In some embodiments, the first flow object also includes one or more of the following: persistent context information associated with the BPMN UI flow, and transient context information associated with the BPMN UI flow. In some embodiments, the first flow object also includes at least one process variable associated with the one or more first actions. In some variants, the at least one process variable includes a plurality of process variables stored in a single data container structure.

In some embodiments, each of the one or more first action definitions includes at least one of the following associated with the first action: an identifier, an action definition reference, and possible state values. In some embodiments, the first page definition includes a page identifier associated with the first page. In some embodiments, the first page definition includes an arbitrary navigation type. In other embodiments, the first page definition defines a plurality of first actions available in the first page.

Other embodiments include other exemplary methods (e.g., procedures) for controlling UI transitions based on a BPMN UI flow. These exemplary methods can be performed by a UI application or a communication device hosting such a UI application.

These exemplary methods can include receive, from a controller application operating on a computing node, a first message including a first flow object of the BPMN UI flow. The first flow object includes the following: a first page definition defining a first page for rendering by the UI application, and one or more first action definitions representing one or more first actions to be rendered within the first page. These exemplary methods can also include rendering the first page on a display of the communication device and transmitting to the controller application a second message indicating a selected one of the first actions.

In some embodiments, these exemplary methods can also include transmitting a request to the controller application to instantiate the BPMN UI flow. In such case, the first message can be received in response to the request.

In some embodiments, these exemplary methods can also include receiving, from the controller application, a third message associated with a first operation of the BPMN UI flow provided by an external service based on the selected first action. The third message includes a second flow object of the BPMN UI flow. The second flow object includes the following: a second page definition defining a second page for rendering by the UI application, and one or more second action definitions representing one or more second actions to be rendered within the second page. In such embodiments, these exemplary methods can also include rendering the second page on the display of the communication device and transmit to the controller application a fourth message indicating a selected one of the second actions.

In some of these embodiments, the external service is a shopping cart service, the first operation creates a user shopping cart with the shopping cart service, and the selected second action adds a user-selected item to the user shopping cart.

In some embodiments, these exemplary methods can also include receiving from the controller application a fifth message associated with a second operation of the BPMN UI flow provided by the external service based on the selected second action. The fifth message includes a third flow object of the BPMN UI flow. The third object flow includes the following: a third page definition defining a third page for rendering by the UI application, and one or more third action definitions representing one or more third actions to be rendered within the third page.

In some embodiments, the UI application is associated with one of the following: a voice response system, a message processing system, or a web graphical user interface (GUI)

In various embodiments, the first flow object can include any of the same content and/or have any of the same characteristics as summarized above for controller application embodiments.

Other embodiments include computing nodes configured to perform operations corresponding to the exemplary methods (e.g., procedures) performed by the controller application, as summarized above. Other embodiments include non-transitory, computer-readable media storing program instructions that, when executed by processing circuitry, configure such computing nodes to perform operations corresponding to the exemplary methods (e.g., procedures) performed by the controller application, as summarized above.

Other embodiments include communication devices configured to perform operations corresponding to the exemplary methods (e.g., procedures) performed by the UI application, as summarized above. Other embodiments include non-transitory, computer-readable media storing program instructions that, when executed by processing circuitry, configure such communication devices to perform operations corresponding to the exemplary methods (e.g., procedures) performed by the UI application, as summarized above.

Embodiments disclosed herein can address the issues of complexity and cost of existing solutions by reducing the cost of UI customizations and leveraging existing standards by enabling the use of BPMN UI flows to define and control UI page transitions. UI pages can be orchestrated by a defined BPMN UI flow that allows for transitions within the BPMN UI flow based on user input from the UI application. The addition of tasks and flow logic to the business process does not require changes to the UI application itself, but rather only to the BPMN UI flow. Consequently, a deployed UI application would not need to be modified or redeployed in response to changes to the BPMN UI flow.

These and other objects, features, and advantages of embodiments of the present disclosure will become apparent upon reading the following Detailed Description in view of the Drawings briefly described below.

BRIEF DESCRIPTION OF THE DRAWINGS

FIG. 3 shows an exemplary method (e.g., procedure) for a controller application, according to various embodiments of the present disclosure.

FIG. 4 shows an exemplary method (e.g., procedure) for a UI application, according to various embodiments of the present disclosure.

FIG. 8, which includes

FIG. 9, which includes

FIG. 10, which includes

DETAILED DESCRIPTION

Figure 1:
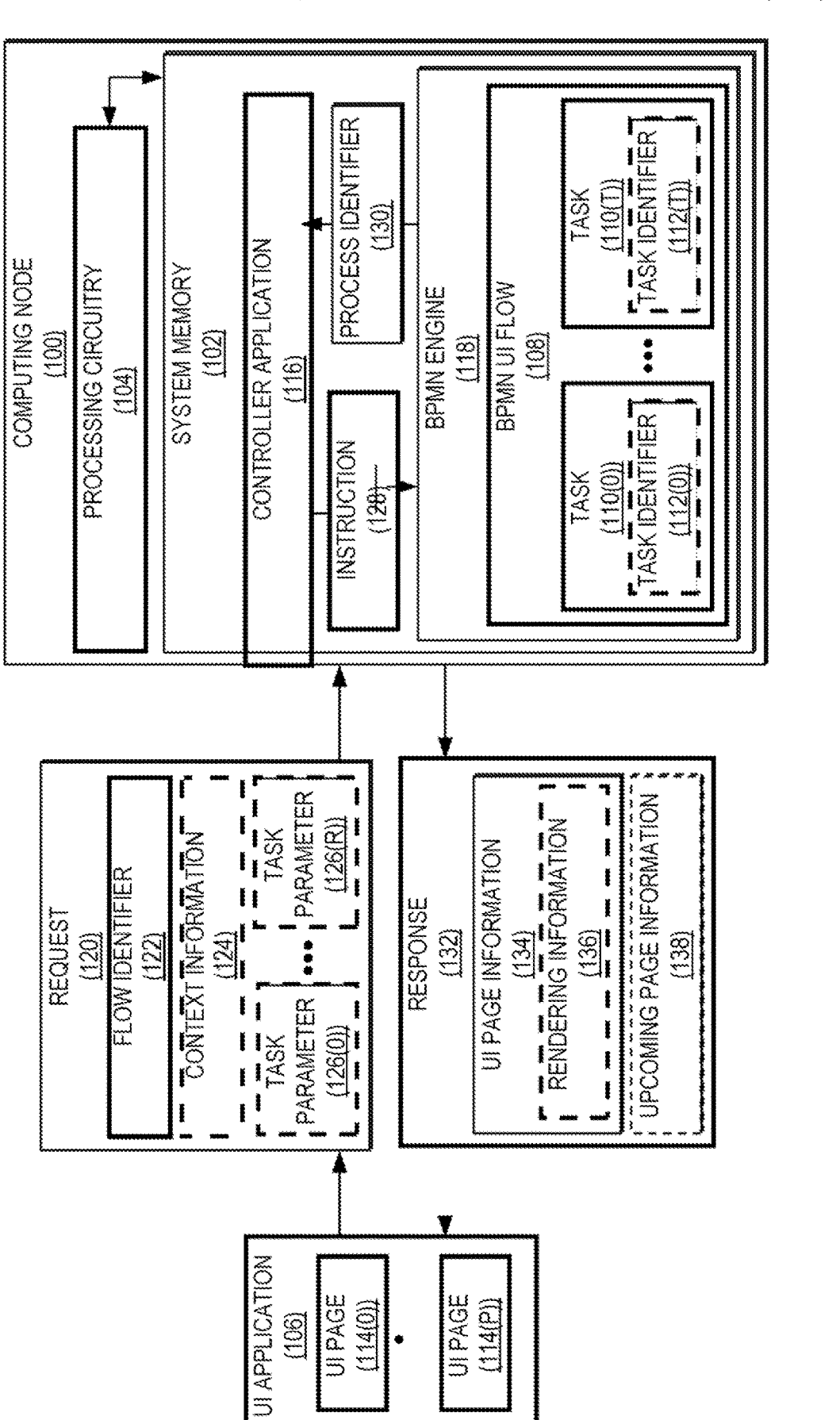
FIG. 1 illustrates one example of a computing node including processing circuitry adapted to control user interface (UI) transitions based on Business Process Model and Notation (BPMN) UI flows according to various embodiments of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Methods and apparatuses for controlling user interface (UI) transitions based on Business Process Model and Notation (BPMN) UI flows are disclosed herein. As noted above, there exist certain challenges with existing solutions. In particular, existing conventional user interface design is often encumbered by complex business logic which is required to be implemented in a UI layer that details the interactions with various downstream systems. Often those interactions are complicated and may vary from one implementation to another because the surrounding ecosystem(s) at telecom operators are vastly different from one another. Certain embodiments provide for moving the complex logic to another layer and allow for the ability to modify the sequence of interactions without affecting the UI.

Accordingly, certain aspects of the present disclosure and their embodiments may provide solutions to the aforementioned or other challenges. In this regard, in the present disclosure, embodiments of apparatuses and methods of operation thereof are proposed for controlling user interface UI transitions based on BPMN UI flows. In various embodiments, a computing node executes a controller application for controlling UI transitions based on a BPMN UI flow. As used herein, the terms "Business Process Model and Notation," "BPMN," and variants and derivatives thereof refer generally to any version of the BPMN open standard notation system for modeling business processes, including BPMN version 2.0. A "BPMN UI flow" is a BPMN representation of a UI flow for a specific business process, and may include flow objects such as events (e.g., a start event or an end event), activities (e.g., an individual task or a sub-process comprising multiple tasks), and gateways that indicate where the BPMN UI flow may fork or merge.

The controller application acts as an intermediary between a UI application that generates a UI for a user, and a BPMN engine that handles the user's navigation through the BPMN UI flow. The BPMN engine may comprise any commercially available BPMN engine, and in various embodiments may be incorporated as part of the controller application. In conventional operation, the controller application receives a first request for a UI page from the UI application. The first request includes a flow identifier that identifies the BPMN UI flow provided by the BPMN engine, and in various embodiments may also include first context information provided by the UI application to the BPMN engine. The controller application then transmits an instruction to the BPMN engine to initiate the BPMN UI flow corresponding to the flow identifier.

The controller application subsequently receives a process identifier corresponding to the BPMN UI flow from the BPMN engine. The controller application uses the process identifier to retrieve a current task identifier from the BPMN engine, where the current task identifier corresponds to a task of the BPMN UI flow. Finally, the controller application returns a first response, based on the current task identifier, to the UI application. The first response includes current UI page information that indicates a current UI page of a plurality of predefined UI pages to be rendered by the UI application. In various embodiments, the current UI page information includes first rendering information for use by the UI application to render the current UI page. The first response according to various embodiments may also include upcoming page information that indicates one or more upcoming UI pages corresponding to one or more tasks of the BPMN UI flow. The upcoming page information may be used by the UI application to render, e.g., page navigation functionality to facilitate user navigation of the UI pages corresponding to the tasks of the BPMN UI flow.

In various embodiments, the controller application later may receive a second request to complete a current task by the BPMN engine and provide next UI page information for a next UI page within the BPMN UI flow. The second request in various embodiments may also include one or more task parameters and/or second context information provided by the UI application to the BPMN engine. The controller application thus retrieves the current task identifier from the BPMN engine using the process identifier and instructs that the BPMN engine to complete the current task using the current task identifier. The controller application then retrieves a next task identifier from the BPMN engine using the process identifier. The controller application finally returns, to the UI application, a second response based on the next task identifier. The second response includes the next UI page information that indicates the next UI page of the plurality of predefined UI pages to be rendered by the UI application. According to various embodiments, the next UI page information may include second rendering information for use by the UI application to render the next UI page.

Embodiments disclosed herein can address the issues of complexity and cost of existing solutions by reducing the cost of UI customizations and leveraging existing standards by enabling the use of BPMN UI flows to define and control UI page transitions. UI pages can be orchestrated by a defined BPMN UI flow that allows for transitions within the BPMN UI flow based on user input from the UI application. The addition of tasks and flow logic to the business process does not require changes to the UI application itself, but rather only to the BPMN UI flow. Consequently, a deployed UI application would not need to be modified or redeployed in response to changes to the BPMN UI flow. Moreover, embodiments disclosed herein leverage market knowledge of BPMN notation for modeling business processes.

FIG. 1 illustrates an example computing node 100 for controlling UI transitions based on a BPMN flow according to various embodiments of the present disclosure. The computing node 100 in FIG. 1 comprises a system memory 102 and processing circuitry 104 that is communicatively coupled to the system memory 102. The computing node 100 of FIG. 1 and the constituent elements thereof may include any known digital logic elements, semiconductor circuits, processing cores, and/or memory structures, among other elements, or combinations thereof. Examples described herein are not restricted to any particular arrangement of elements, and it is to be understood that various embodiments of the computing node 100 may include more or fewer elements than illustrated in FIG. 1. For example, the processing circuitry 104 may further include one or more functional units, instruction caches, unified caches, memory controllers, interconnect buses, and/or additional memory devices, caches, and/or controller circuits, which are omitted from FIG. 1 for the sake of clarity.

The computing node 100 is communicatively coupled (e.g., via a private network or a public network such as the internet) to a UI application 106. The UI application 106 may execute, e.g., on a client computing node (not shown) and may provide user access to a business process that is represented as a BPMN UI flow 108 of the computing node 100. The BPMN UI flow 108 is modeled to drive and orchestrate a UI, and may include, among other elements, a plurality of tasks 110(0)-110(T) that each correspond to one of a plurality of task identifiers 112(0)-112(T). The constituent elements of an example BPMN UI flow such as the BPMN UI flow 108 of FIG. 1 are discussed in greater detail below with respect to FIG. 2.

The UI application 106 comprises a plurality of predefined UI pages ("UI PAGE") 114(0)-114(P), each of which may define how data received from the computing node 100 is formatted and presented to a user of the UI application 106. In this manner, the UI interface generated by the UI application 106 may be decoupled from the underlying data provided by the computing node 100. However, it is desirable to provide a mechanism for controlling transitions between UI pages such as the UI pages 114(0)-114(P) without the need to hard-code business logic into the UI application 106 itself.

Accordingly, the computing node 100 of FIG. 1 executes a controller application 116, as well as a BPMN engine 118 to which the controller application 116 is communicatively coupled. The controller application 116 may be implemented as a microservice configured to communicate with the UI application 106 via an interface such as a Representational State Transfer (REST) application programming interface (API). The BPMN engine 118 may be any conventional BPMN engine 118 adapted to manage navigation through a BPMN UI flow such as the BPMN UI flow 108. Although illustrated as separate elements in FIG. 1, various embodiments may provide that the BPMN engine 118 may be integrated into the controller application 116 (e.g., as a shared code library or executable component of the controller application 116). The controller application 116 acts as an intermediary between the UI application 106 and the BPMN engine 118 by receiving requests from the UI application 106, communicating with the BPMN engine 118 on behalf of the UI application 106, and sending responses to the UI application 106 containing information for use in rendering the UI pages 114(0)-114(P).

In example operation, the controller application 116 first receives a request 120 for a UI page from the UI application 106. The request 120 includes a flow identifier 122 that corresponds to the BPMN UI flow 108. In various embodiments, the request 120 may also include context information 124 provided by the UI application 106 to the BPMN engine 118. The context information 124 may include data such as state information persisted from an earlier UI page, data indicating a user selection or user-initiated operation, information captured in a UI form, information indicating an alteration in execution of the BPMN UI flow 108, and/or other metadata, as non-limiting examples. If the UI page being requested by the UI application 106 corresponds to a task of the tasks 110(0)-110(T) that requires or accepts input parameters, the request 120 in various embodiments may also include one or more task parameters 126(0)-126(R).

If the request 120 corresponds with a request to initiate the BPMN UI flow 108, the controller application 116 transmits an instruction 128 to initiate the BPMN UI flow 108 to the BPMN engine 118. The controller application 116 then receives a process identifier 130 that corresponds to the BPMN UI flow 108. The controller application 116 also retrieves a task identifier, such as one of the task identifiers 112(0)-112(T) using the process identifier 130. The controller application 116 then returns a response 132 to the UI application 106. The response 132 includes UI page information 134 that indicates a UI page, such as the UI page 114(0), of the plurality of predefined UI pages 114(0)-114(P) to be rendered by the UI application 106. In various embodiments, the UI page information 134 also includes rendering information 136 that may be used by the UI application 106 to render the UI page 114(0). Various embodiments may also include upcoming page information 138 that indicates one or more upcoming UI pages of the plurality of predefined UI pages 114(0)-114(P) corresponding to one or more tasks 110(0)-110(T) of the BPMN UI flow 108. This may be useful, for example, in rendering page navigation functionality to facilitate user navigation of the UI pages 114(0)-114(P) corresponding to the tasks 110(0)-110(T) of the BPMN UI flow 108.

Figure 2:
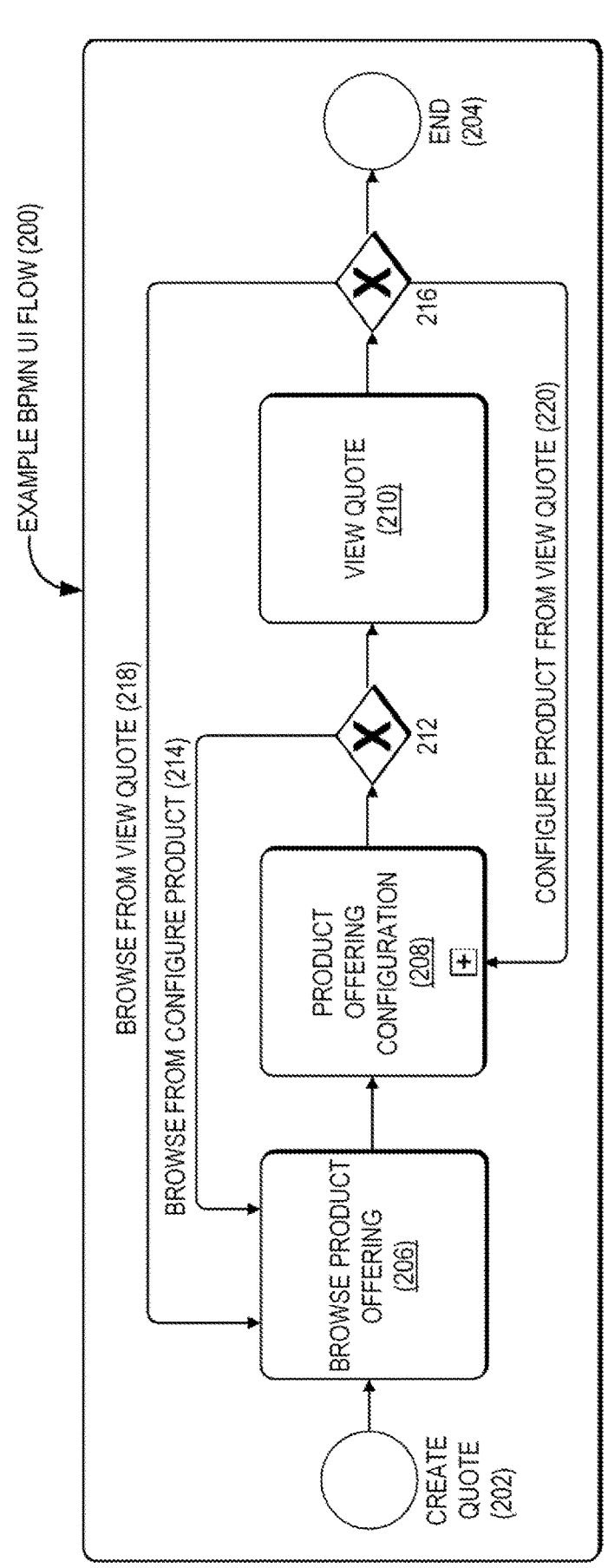
FIG. 2 illustrates one example of a BPMN UI flow that may be used to control UI transitions, according to various embodiments of the present disclosure.

FIG. 2 illustrates constituent elements of a BPMN UI flow such as the BPMN UI flow 108 of FIG. 1, according to various embodiments of the present disclosure. In FIG. 2, an example BPMN UI flow 200 represents activities for a Configure, Price, Quote (CPQ) business process using standard BPMN flowchart shapes. In the BPMN UI flow 200, events that denote an occurrence are represented by circles. Thus, the CPQ business process shown in the BPMN UI flow 200 begins with a Create Quote event 202 and terminates with an End event 204. Activities within the BPMN UI flow 200 are represented by rounded-corner rectangles and denote work done by the business at each operation within the BPMN UI flow 200. An activity may involve a single task (i.e., an atomic unit of work that cannot be broken down into lower-level tasks) or may be a sub-process that represents multiple tasks. The activities comprising the CPQ business process illustrated in FIG. 2 include the Browse Product Offering task 206, the Product Offering Configuration sub-process 208, and the View Quote task 210.

Sequence and messaging flows within the BPMN UI flow 200 are represented by connecting objects (e.g., arrows), as well as gateways, represented by diamond shapes, that indicate forking or merging of paths. In the example of FIG. 2, a gateway 212 indicates that the main sequence flow may be diverted from the Product Offering Configuration sub-process 208 back to the Browse Product Offering task 206, as indicated by connecting object 214. Similarly, the gateway 216 indicates that the main sequence flow may be diverted from the View Quote task 210 back to the Browse Product Offering task 206, as indicated by connecting object 218. The main sequence flow may also be diverted from the View Quote task 210 back to the Product Offering Configuration sub-process 208, as indicated by connecting object 220.

FIG. 3 shows an exemplary method (e.g., procedure) for controlling UI transitions based on a BPMN UI flow, according to various embodiments of the present disclosure. The exemplary method shown in FIG. 3 can be performed by various controller applications and/or computing nodes described elsewhere herein, such as a controller application executing on a computing node.

The exemplary method can include the operations of block 320 where the controller application can transmit, to a UI application communicatively coupled to the controller application, a first message including a first flow object of the BPMN UI flow. The first flow object includes the following: a first page definition defining a first page for rendering by the UI application, and one or more first action definitions representing one or more first actions to be rendered within the first page. The exemplary method can include the operations of block 330, where the controller application can receive, from the UI application, a second message indicating a selected one of the first actions. The exemplary method can also include the operations of block 340, where based upon the selected first action, the controller application can request a first operation of the BPMN UI flow from an external service.

In some embodiments, the exemplary method can include the operations of block 310, where the controller application can receive a request from the UI application to instantiate the BPMN UI flow. In such case, transmitting the first message (e.g., in block 320) is responsive to receiving the request in block 310.

In some embodiments, the exemplary method can also include the operations of blocks 350-370. In block 350, the controller application can transmit, to the UI application, a third message associated with the first operation. The third message includes a second flow object of the BPMN UI flow. The second flow object includes the following: a second page definition defining a second page for rendering by the UI application, and one or more second action definitions representing one or more second actions to be rendered within the second page. In blocks 360-370, the controller application can receive from the UI application a fourth message indicating a selected one of the second actions and, based on the selected second action, request a second operation of the BPMN UI flow from the external service.

In some embodiments, the external service is a shopping cart service, the first operation creates a user shopping cart with the shopping cart service, and the second operation adds a user-selected item to the user shopping cart. FIG. 9 shows an example of these embodiments.

In some embodiments, the exemplary method can also include the operations of block 380, where the controller application can transmit to the UI application a fifth message associated with the second operation. The fifth message includes a third flow object of the BPMN UI flow. The third object flow includes the following: a third page definition defining a third page for rendering by the UI application, and one or more third action definitions representing one or more third actions to be rendered within the third page.

In some embodiments, the UI application is associated with one of the following: a voice response system, a message processing system, or a web graphical user interface (GUI)

Figure 7:
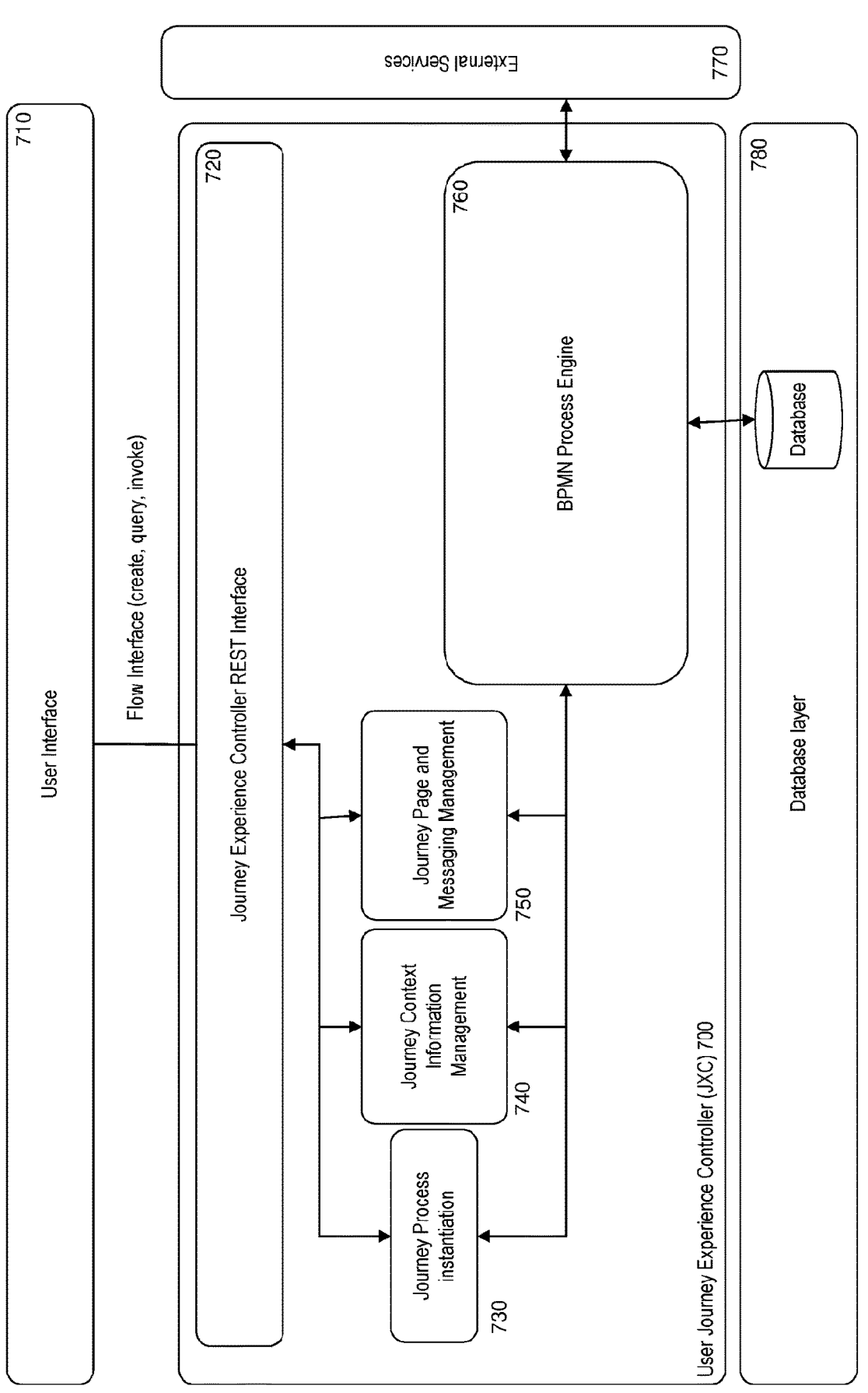
FIG. 7 shows a high-level diagram of an architecture for controlling UI transitions based on a BPMN UI flow, according to various embodiments of the present disclosure.

In some embodiments, requesting the first operation from the external service in block 340 is performed by a BPMN process engine. In some variants, the BPMN engine is integrated with the controller application. FIG. 7 shows an example of these variants.

In some embodiments, the first flow object includes at least one of the following associated with the BPMN UI flow: a flow identifier, a business key, a specification, a flow channel, and an actor. In some embodiments, the first flow object also includes one or more of the following: persistent context information associated with the BPMN UI flow, and transient context information associated with the BPMN UI flow. In some embodiments, the first flow object also includes at least one process variable associated with the one or more first actions. In some variants, the at least one process variable includes a plurality of process variables stored in a single data container structure.

In some embodiments, each of the one or more first action definitions includes at least one of the following associated with the first action: an identifier, an action definition reference, and possible state values. In some embodiments, the first page definition includes a page identifier associated with the first page. In some embodiments, the first page definition includes an arbitrary navigation type. In other embodiments, the first page definition defines a plurality of first actions available in the first page.

FIG. 4 shows an exemplary method (e.g., procedure) for controlling UI transitions based on a BPMN UI flow, according to various embodiments of the present disclosure. The exemplary method shown in FIG. 4 can be performed by various UI applications and/or communication devices described herein, such as a UI application executing on a communication device.

The exemplary method can include the operations of block 420, where the UI application can receive, from a controller application operating on a computing node, a first message including a first flow object of the BPMN UI flow. The first flow object includes the following: a first page definition defining a first page for rendering by the UI application, and one or more first action definitions representing one or more first actions to be rendered within the first page. The exemplary method can also include the operations of block 430, wherein the UI application can render the first page on a display of the communication device. The exemplary method can also include the operations of block 440, wherein the UI application send, to the controller application, a second message indicating a selected one of the first actions.

In some embodiments, the exemplary method can include the operations of block 410, where the UI application can transmit a request to the controller application to instantiate the BPMN UI flow. In such case, the first message can be received in block 420 in response to the request.

In some embodiments, the exemplary method can also include the operations of blocks 450-460. In block 450, the UI application can receive, from the controller application, a third message associated with a first operation of the BPMN UI flow provided by an external service based on the selected first action. The third message includes a second flow object of the BPMN UI flow. The second flow object includes the following: a second page definition defining a second page for rendering by the UI application, and one or more second action definitions representing one or more second actions to be rendered within the second page. In blocks 455-460, the UI application can render the second page on the display of the communication device and transmit to the controller application a fourth message indicating a selected one of the second actions.

In some of these embodiments, the external service is a shopping cart service, the first operation creates a user shopping cart with the shopping cart service, and the selected second action adds a user-selected item to the user shopping cart.

In some embodiments, the exemplary method can also include the operations of block 480, where the UI application can receive from the controller application a fifth message associated with a second operation of the BPMN UI flow provided by the external service based on the selected second action. The fifth message includes a third flow object of the BPMN UI flow. The third object flow includes the following: a third page definition defining a third page for rendering by the UI application, and one or more third action definitions representing one or more third actions to be rendered within the third page.

In some embodiments, the UI application is associated with one of the following: a voice response system, a message processing system, or a web graphical user interface (GUI)

In some embodiments, the first flow object includes at least one of the following associated with the BPMN UI flow: a flow identifier, a business key, a specification, a flow channel, and an actor. In some embodiments, the first flow object also includes one or more of the following: persistent context information associated with the BPMN UI flow, and transient context information associated with the BPMN UI flow. In some embodiments, the first flow object also includes at least one process variable associated with the one or more first actions. In some variants, the at least one process variable includes a plurality of process variables stored in a single data container structure.

In some embodiments, each of the one or more first action definitions includes at least one of the following associated with the first action: an identifier, an action definition reference, and possible state values. In some embodiments, the first page definition includes a page identifier associated with the first page. In some embodiments, the first page definition includes an arbitrary navigation type. In other embodiments, the first page definition defines a plurality of first actions available in the first page.

In various embodiments, the controller application provides for a UI design solution that is highly customizable in which a sequence of transitions between different UI screens can be controlled by a business process defined using, for example, BPMN 2.0 notations and executed on a suitable business process execution engine. Other existing conventional solutions attempt to solve this problem using tools to automatically generate user interface source code based on definitions expressed in proprietary notations. In addition, conventional tools exist that produce configuration code which is then interpreted at run time by the user interface client.

Existing conventional controllers are limited to providing a linear guided navigation to the user interface. At any given point, it is only possible to navigate either to the next page or to go back to the previous page. This kind of navigation is termed as a "Guided" navigation type. Various embodiments described herein provide for arbitrary navigation types as further described herein.

One or more embodiments described herein provide for a new REST API, referred to herein as a Flow Manager API, to enhance the capabilities of the controller application.

Enhancement to existing capabilities of the controller application may include one or more of supporting of arbitrary navigation types including providing for multiple actions within a given page, and providing for the capability to discover or introspect the number of input variables and their corresponding data types for each available action. One or more embodiments may provide optimized data storage for process variables using a specialized container data type for storing multiple process variables to avoid multiple reads and writes from a database. One or more embodiments may provide for the ability to perform complex business logic as part of a business process instead of requiring the logic to be executed by the User Interface client. One or more embodiments may further provide for the ability to support headless channels such as interactive voice response systems or short code processing systems.

Figure 5:
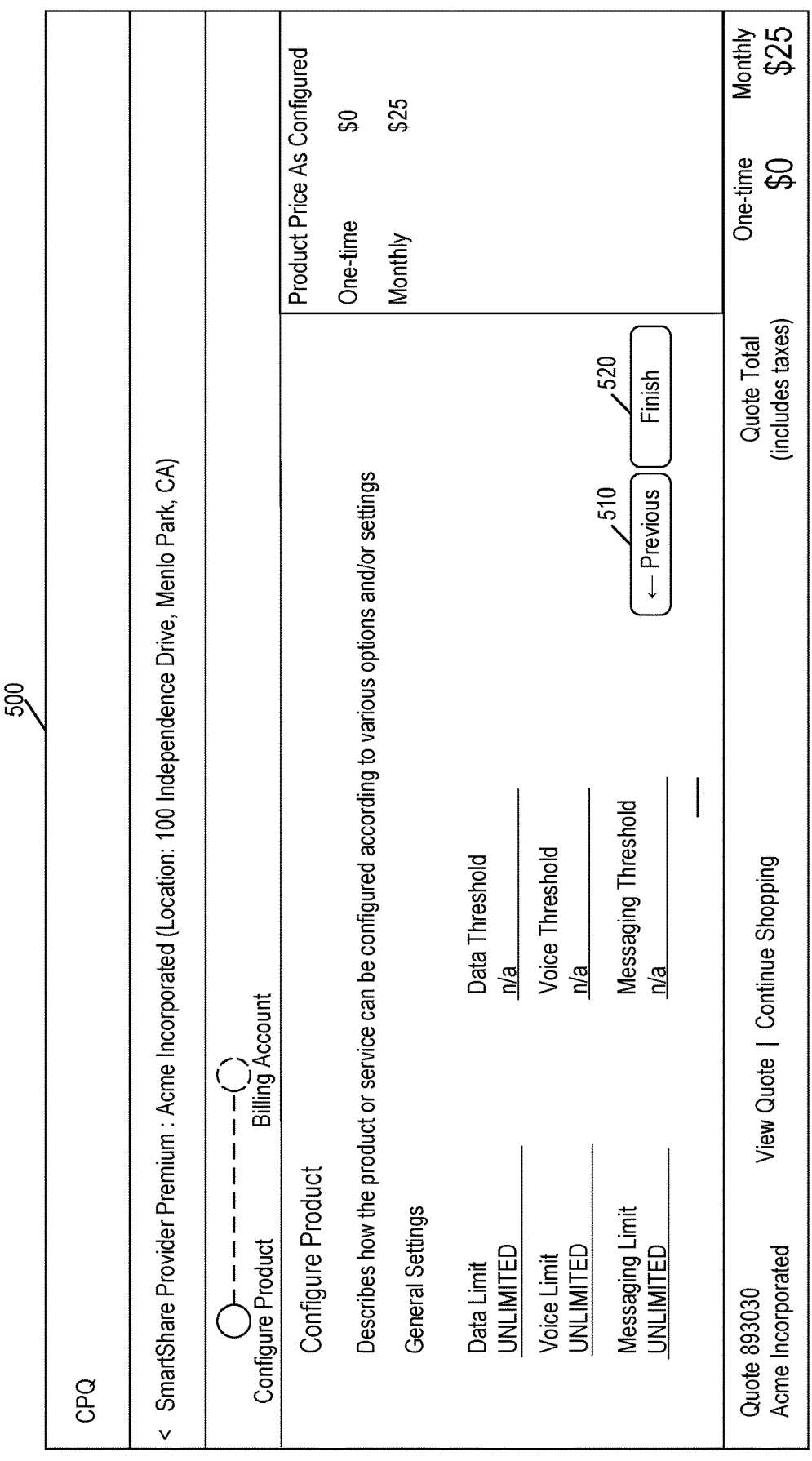
FIG. 5 illustrates an example of a UI page associated with a flow using a guided navigation type.

As described above, one or more embodiments provide for arbitrary UI navigation types. It is useful to understand the concepts and differences between guided navigation types and arbitrary navigation types. FIG. 5 illustrates an example of a UI page 500 associated with a flow using a guided navigation type. In the UI page 500, only linear navigation by a user is possible including backward navigation by interacting with a "Previous" icon to return to a previous page within the flow, or forward navigation by interacting with a "Finish" icon to complete a product configuration during a product shopping flow.

Figure 6:
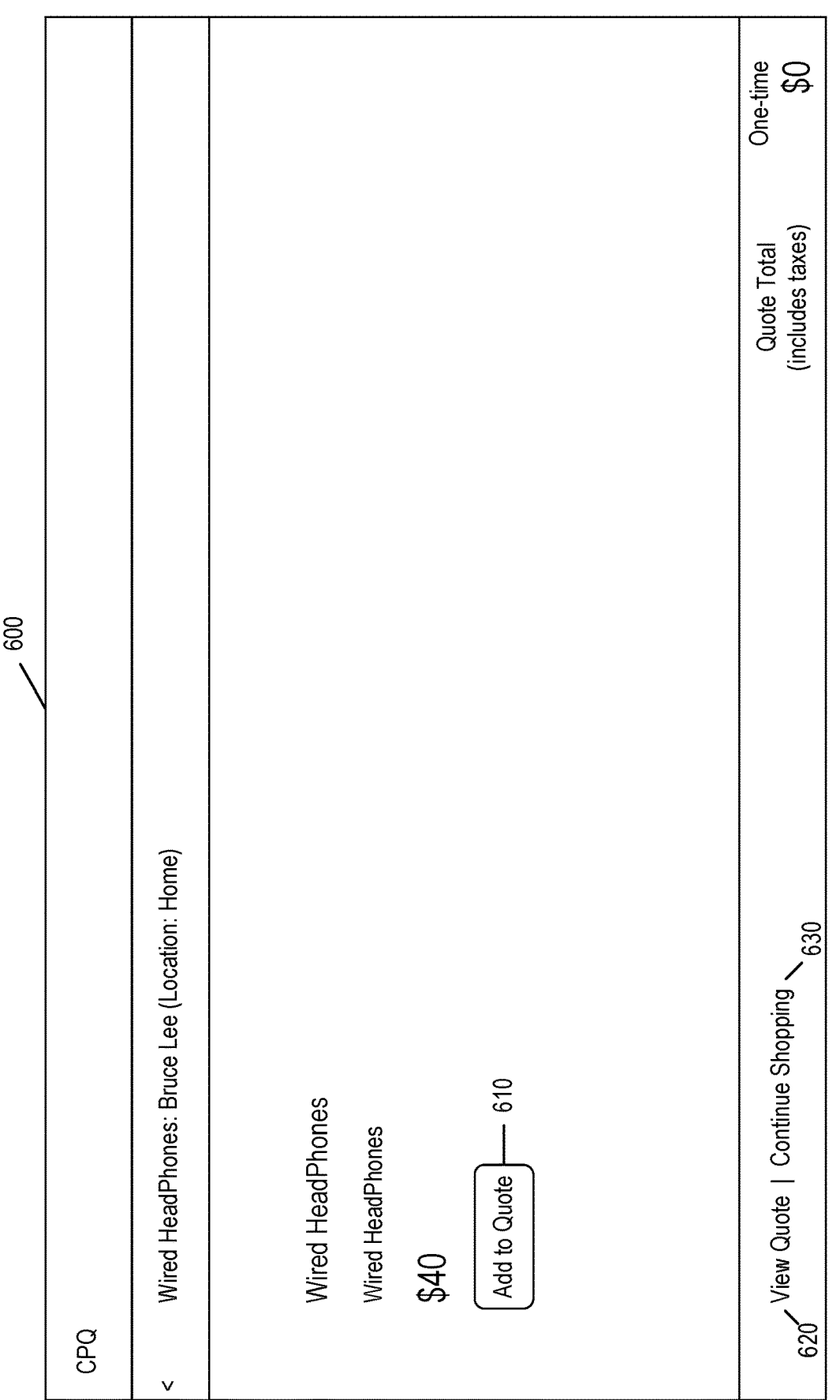
FIG. 6 illustrates an example of a UI page associated with a flow using an arbitrary navigation type.

FIG. 6 illustrates an example of a UI page 600 associated with a flow using an arbitrary navigation type. In the UI page 600, multiple exit points are available to the user the ability to add to an existing quote by interacting with an "Add to Quote" icon 610, view the existing quote by interacting with a "View Quote" icon 610, or continue shopping by interacting with a "Continue Shopping" icon 630. The arbitrary navigation type is a more natural form of navigation within user interfaces. When a page is presented to the user, certain UI control elements such as buttons, drop-down menus, or radio/check boxes, etc. provide a more natural ability for a human to interact with the UI to indicate the user's preference regarding what action to perform next. Upon selecting or clicking on such control elements, the UI then transmits the indicated preference to the controller application.

In one or more embodiments, a flow is a representation of a UI journey instantiated in response to a user action performed on the UI. In various embodiments, it is not always necessary that a UI be present to instantiate a flow as it is also possible to use a simplified version of a flow to drive a headless channel such as an automated voice response system or a short message processing system. A flow is a mapping between elements of a business process defined, for example, using BPMN 2.0 notations and concepts which are meaningful in the user interface design domain. Various of the key elements of a flow include a page, an action, and a context container described in further detail below.

Page: A page represents a view rendered by a UI in order to interact with a user. A page displays information items along with user interface elements such as lists, forms, buttons, or checkboxes, etc. so that a user can make selections, provide inputs or initiate actions. Whenever a page is rendered, it remains in front of the user's view unless an action initiated by the user causes it to navigate away to a different page.

Action: When a page is displayed, the user has a choice of performing one or more actions which are meaningful in the context of that page. For example, performing an action may lead the business process to continue its defined execution path to either lead to the same page or a different page.

Context Data Container: When dealing with data associated with a running business process instance, several process variables are stored in a single "container" data structure. This causes the process execution engine to only see a single process variable and hence only a single database read/write instead of one per variable is required.

One or more embodiments provide for enhanced capabilities for a controller to allow complete control over UI page transitions as well as providing available control options to be presented to the interacting user. These capabilities allow dynamic UIs to be developed which react and present varying set of control options based on the determination of the underlying business process. Support for arbitrary navigation types enables support for all possible types of UI applications which were previously limited to UI applications that offer only a guided (or wizard-like) interface.

One or more embodiments provide for channel awareness to allow the same business process definition to drive user interfaces belonging to different interaction channels such as a web GUI or an interactive voice response system. In addition, various embodiments provided for optimized process data variable storage to improve performance by avoiding multiple read/write calls (i.e., once for each variable) towards a database.

FIG. 7 shows a high-level diagram of an architecture for controlling UI transitions based on a BPMN UI flow, according to various embodiments of the present disclosure. A user interface layer 710 represents the range of possible user interfaces which can make use of the controller 700 (also referred to as "controller application") for user interface orchestration. The Journey Experience Controller REST API 720 interprets a BPMN business process that has been modeled to drive and orchestrate user interfaces. In one or more embodiments, special tagging is used in BPMN user activities to indicate when a UI page must be transitioned or presented along with non-UI related process activities. In one or more embodiments, controller 700 may take the form of a microservice node.

Controller 700 includes a journey process instantiation function 730, which is responsible for the process instantiation with additional metadata such as context information and external entities which are associated with the journey such a Shopping Cart from a CPQ solution or other service. In addition to process instantiation, the controller 700 may include a journey context information management function 740 which, if configured so, may store externally any context information which is passed without impacting process execution.

The controller 700 also includes a messaging management function, denoted Journey Page and Messaging Management 750. This function coordinates API calls moving between UI pages and an embedded BPMN process engine (e.g., executor) 760, which runs modeled BPMN processes and associated logic. The BPMN process engine 760 may communicate with external services 770 and persist process execution state in a database 780. Although FIG. 7 illustrates the BPMN process engine 760 as being embedded within controller 700, in other embodiments the BPMN process engine 760 may be external to the controller 700 such as within another network node.

Figure 8A:
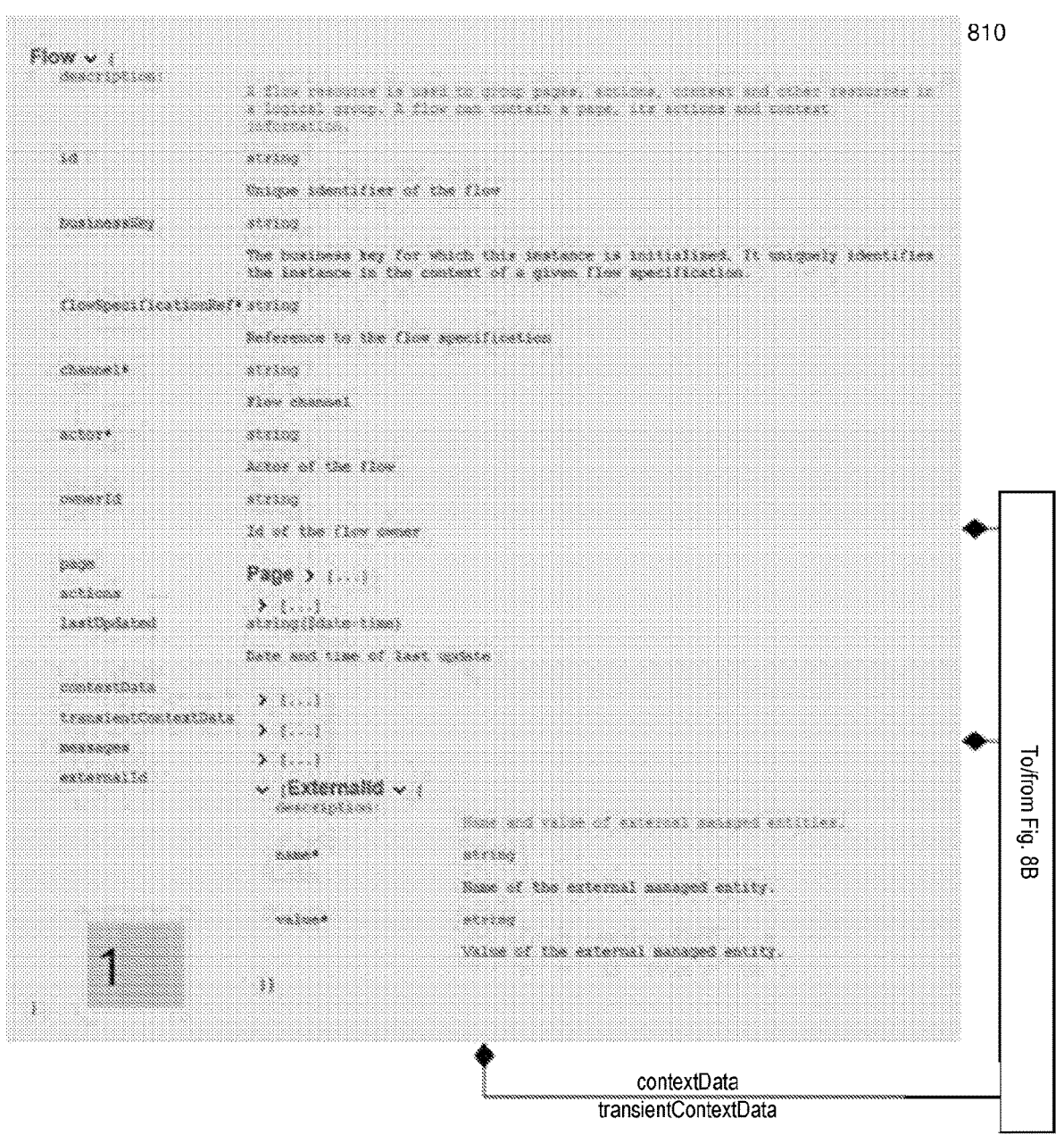
FIGS. 8A-B, illustrates a block diagram of a flow manager REST API object model representation, according to various embodiments of the present disclosure.
Figure 8B:
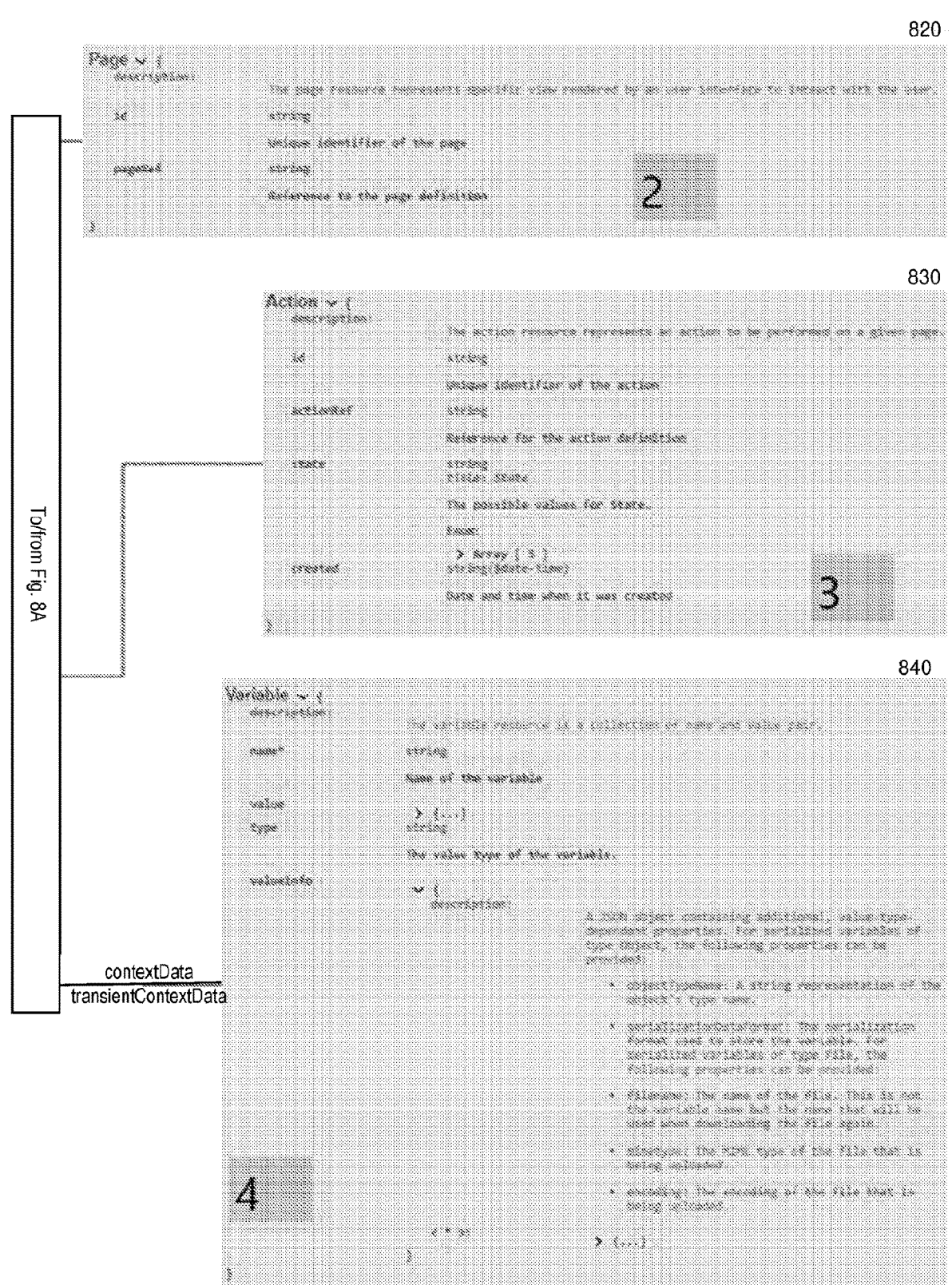

FIG. 8, which includes FIGS. 8A-B, illustrates a block diagram of a flow manager REST API object model representation 800 according to various embodiments. The flow manager REST API object model representation depicts main API objects including a Flow object 810, a Page object 820, Action objects 830, and Variables 840. The Flow object 810 is instantiated and represents the state of the running business process. The Flow object 810 includes the Page object 820 which indicates the current page which must be rendered and presented to the user. The Flow object 810 also includes a collection of Action objects 830 which represent the choices to be presented to the user in the form of UI controls. Data can be exchanged to and from the UI in the form of Variables 740 which are collected in the form of Context Data which is persisted and Transient Content Data which is ephemeral.

In the embodiment illustrated in FIG. 8, the Flow object 810 is used to group pages, actions, contexts, and other resources in a logical group. A flow can contain a page, its actions and text information. In an embodiment, the flow object 810 may include one or more of a unique identifier of the flow (id), a business key for which the instance is initialized (businessKey) which uniquely identifies the instance in the context of a given flow specification, a reference to the flow specification (flowSpecificationRef), a flow channel (channel), an actor of the flow (actor), and ID of the flow owner (ownerId), and a page (Page). The Page may include one or more actions (actions), a date and time of last update (lastUpdated), context data (contextData), transient context data (transientContextData), messages, and a name (name) and value (value) of one or more external managed entities (externalId).

The Page object 820 is a page resource that represents a specific view rendered by the UI to interact with the user and includes a unique identifier of the page (id) and a reference to the page definition (pageRef). The Action object 830 is an action resource that represents an action to be performed on a given page. The Action object 830 includes a unique identifier of the action (id), a reference for the action definition (actionRef), an array including possible values for a State of the action (state), and a data and time when the action was created (created).

The Variable object 840 is a variable resource that includes a collection of name and value pairs. The Variable object 840 includes a name of the variable (name), a value of the variable (value), a value type of the variable (type), and value-type-dependent properties (valueInfo). In the embodiment illustrated in FIG. 8, the valueInfo object is a JavaScript Object Notation (JSON) object containing additional value-type-dependent properties. For serialized variables of type Object, the following properties can be provided: objectTypeName—a string representation of the object's type name; and serializationDataFormat—the serialization format used to store the variable. For serialized variables of type File, the following properties can be provided: filename—the name of the file (this is not the variable name but the name that will be used when downloading the file again); mimetype—the MIME type of the file that is being uploaded; and encoding—the encoding of the file that is being uploaded.

Figure 9A:
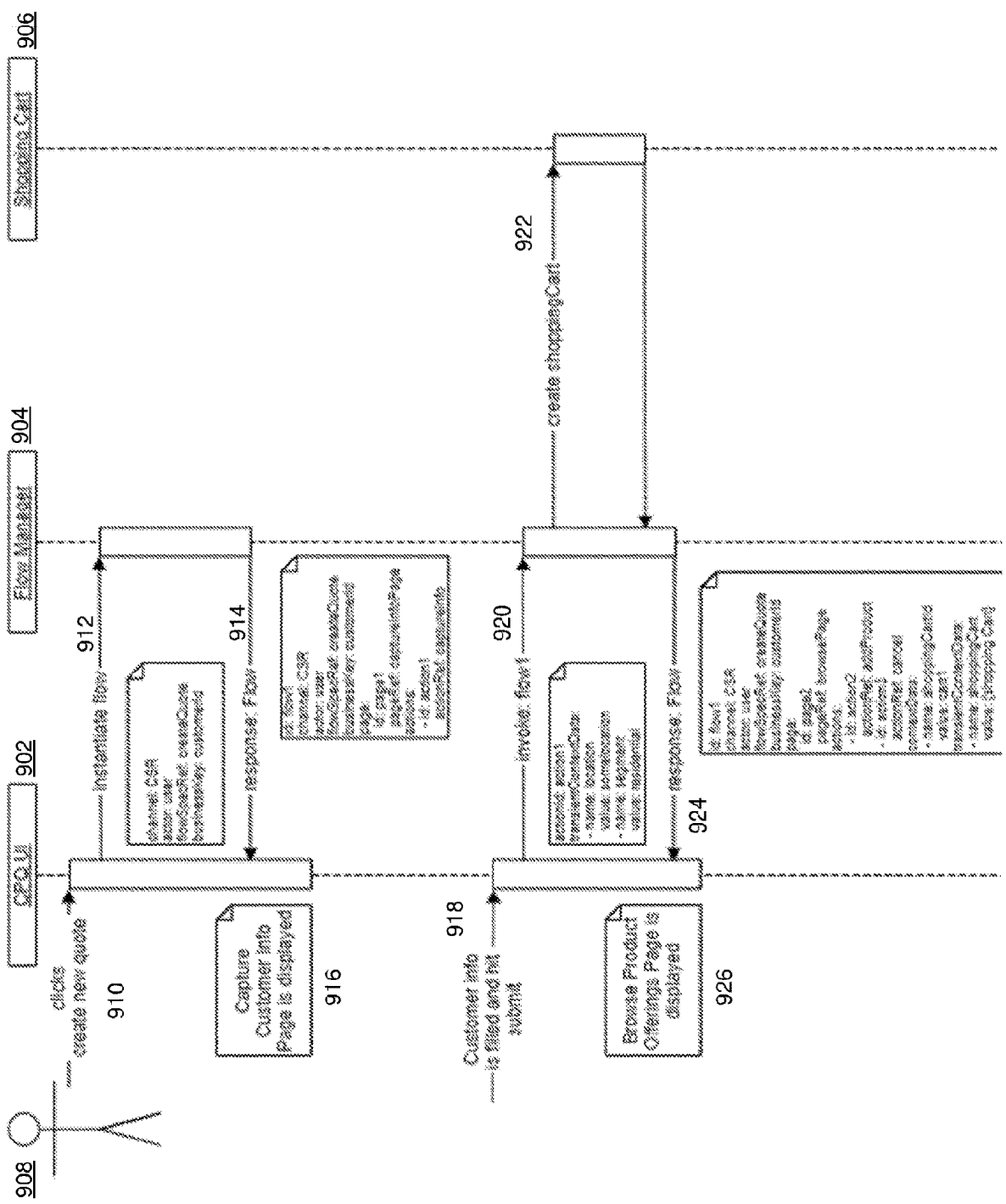
FIGS. 9A-B, illustrates a flow sequence diagram illustrating example operations between a UI application and a flow manager of a controller application, according to various embodiments of the present disclosure.
Figure 9B:
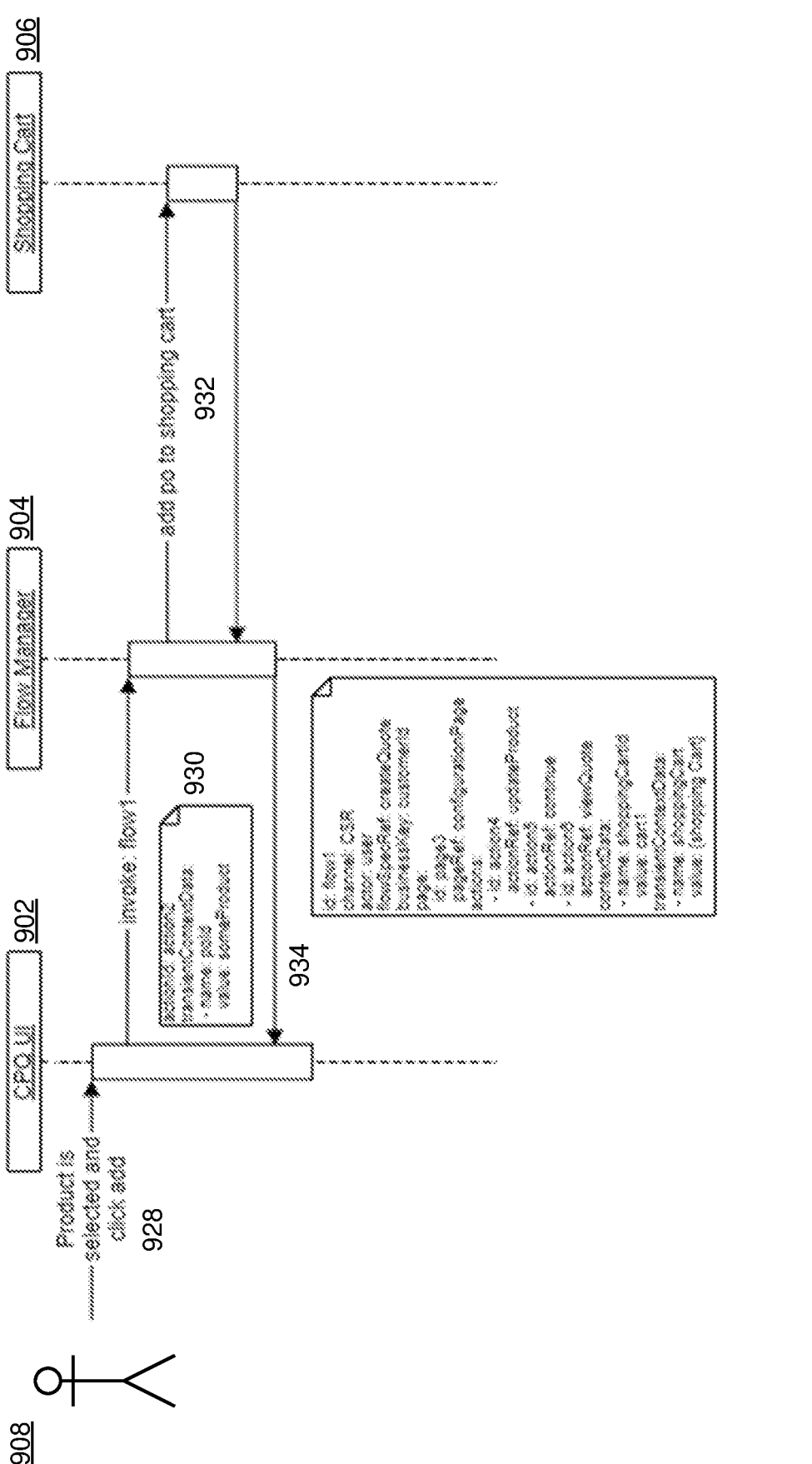

FIG. 9, which includes FIGS. 9A-B, illustrates a flow sequence diagram 900 illustrating example operations between a UI application and a flow manager of a controller according to various embodiments. For example, the operations shown in FIG. 9 can correspond to various operations discussed above in relation to FIGS. 3-4. More specifically, FIG. 9 illustrates interactions performed between a CPQ UI application 902 and a flow manager 904 of the controller 700 (shown in FIG. 7) associated with a downstream Shopping Cart service 906 or other service provided by an entity. In various embodiments, the UI application 902 does not have to interact directly with nor execute any logic related to the downstream Shopping Cart service. In various embodiments, the UI application 902 can execute on a communication device, e.g., a wireless communication device (also known as user equipment, or UE) that can communicate via a wireless network.

At each operation after the instantiate operation, the response of the controller 700 indicates the page to be displayed and the list of available actions to be presented to a user 908. Upon selecting an action via an invoke operation, the business process execution transitions the flow. In a response, a new page and a new list of available actions is made available. For example, from the Browse Product Offering page, when the action "addProduct" is indicated in the invoke operation, the response indicates that the Product Configuration page be displayed and the user be presented with UI controls corresponding to the actions "updateProduct", "viewQuote" or "continue" be made available.

In operation 910, the user 908 clicks the CPQ UI 902 to create a new quote. In operation 912, CPQ UI 902 instantiates a flow with flow manager 904. In the instantiation operation, CPQ UI 902 sends data to the flow manager 904 using the REST API including the following information:

channel: CSR
    actor: user
    flowSpecRef: createQuote
    businessKey: customerid In operation 914, the flow manager 904 sends a flow response to the CPQ UI using the REST API including the following information:

id: flow1
    channel: CSR
    actor: user
    flowSpecRef: createQuote
    businessKey: customerid
    page:
        id: page 1
        pageRef: captureInfoPag
        actions:
            id: action 1
            ActionRef: captureinfo In operation 916, the CPQ UI 902 displays a Capture Customer Info Page to prompt the user 908 to provide customer information. In operation 918, the CPQ UI 902 receives customer information by the user 908 filling in the customer information in the Capture Customer Info Page and pressing a submit button. In operation 920, the CPQ UI 902 invokes a flow (flow1) with the flow manager 904 using the REST API including the following information:

actionid: action1
    transientContextData:
        name: location
        value: somelocation
        name: segment
        value: residential In operation 922, the flow manager 904 creates a shopping cart with the Shopping Cart service 906. In operation 924, the flow manager sends a flow response message using the REST API including the following information:

id: flow1
    channel: CSR
    actor: user
    flowSpecRef: createQuote
    businessKey: customerid page:
        id: page2
        pageRef: browsePage
        actions:
            id action2
            actionRef: addProduct
            id action3
            actionRef: cancel
        contextData:
            name: shoppingCartid
            value: cart1
        transientContextData:
            name: shoppingCart
            value: {shopping Cart}

In operation 926, the CPQ UI 902 displays a Browse Product Offerings Page to the user 908 including two possible actions for the user 904 including addProduct (action2) and cancel (action3). In operation 928, the user 908 selects a product and clicks add within the UI. In 930, the CPQ UI 902 invokes another flow (flow1) with the flow manager 904 using the REST API including the following information:

actionid: action2
    transientContextData:
        name: poid
        value: someProduct In operation 932, the flow manager 904 adds the selected product to shopping cart with the Shopping Cart service 906. In operation 934, the flow manager sends a flow response message using the REST API including the following information:

id: flow1
    channel: CSR
    actor: user
    flowSpecRef: createQuote
    businessKey: customerid
    page:
        id: page3
        pageRef: configurationPage
        actions:
            id action4
            actionRef: updateProduct
            id action5
            actionRef: continue
            id action6
            actionRef: viewQuote
        contextData:
            name: shoppingCartid
            value: cart1
        transientContextData:
            name: shoppingCart
            value: {shopping Cart}

The response includes three actions available to the user 908 including updating a product (updateProduct), continuing (continue), and viewing a quote (viewQuote). Operations may continue until the user 908 is finished with the shopping experience.

Figure 10A:
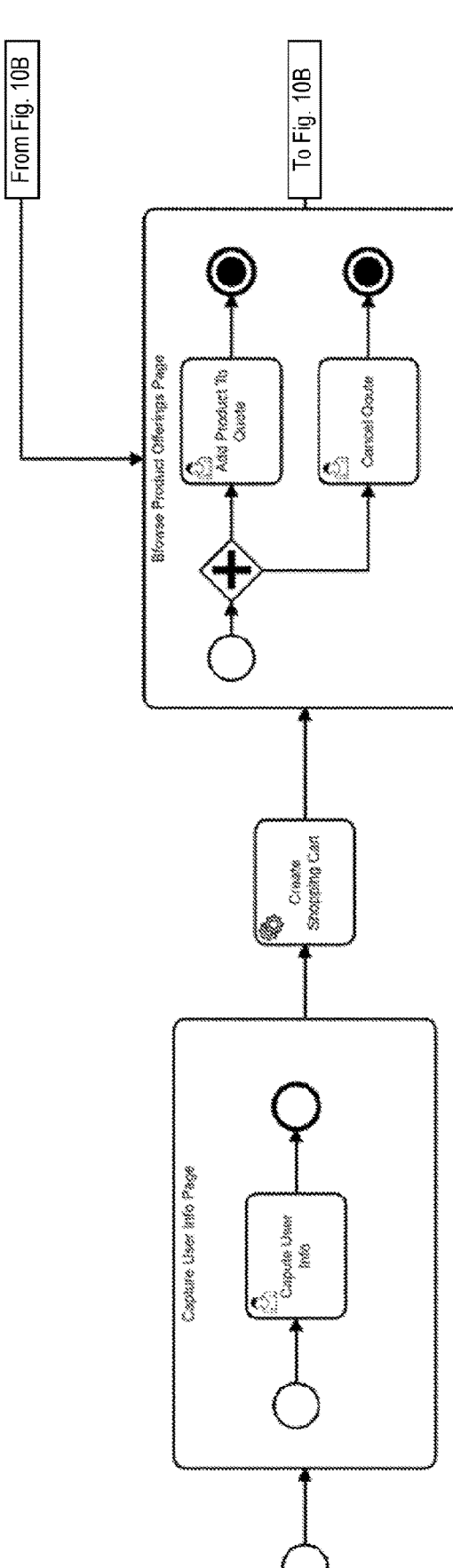
FIGS. 10A-C, shows a block diagram in BPMN of operations by the CPQ UI application and the flow manager of the controller application shown in FIG. 9, according to various embodiments of the present disclosure.
Figure 10B:
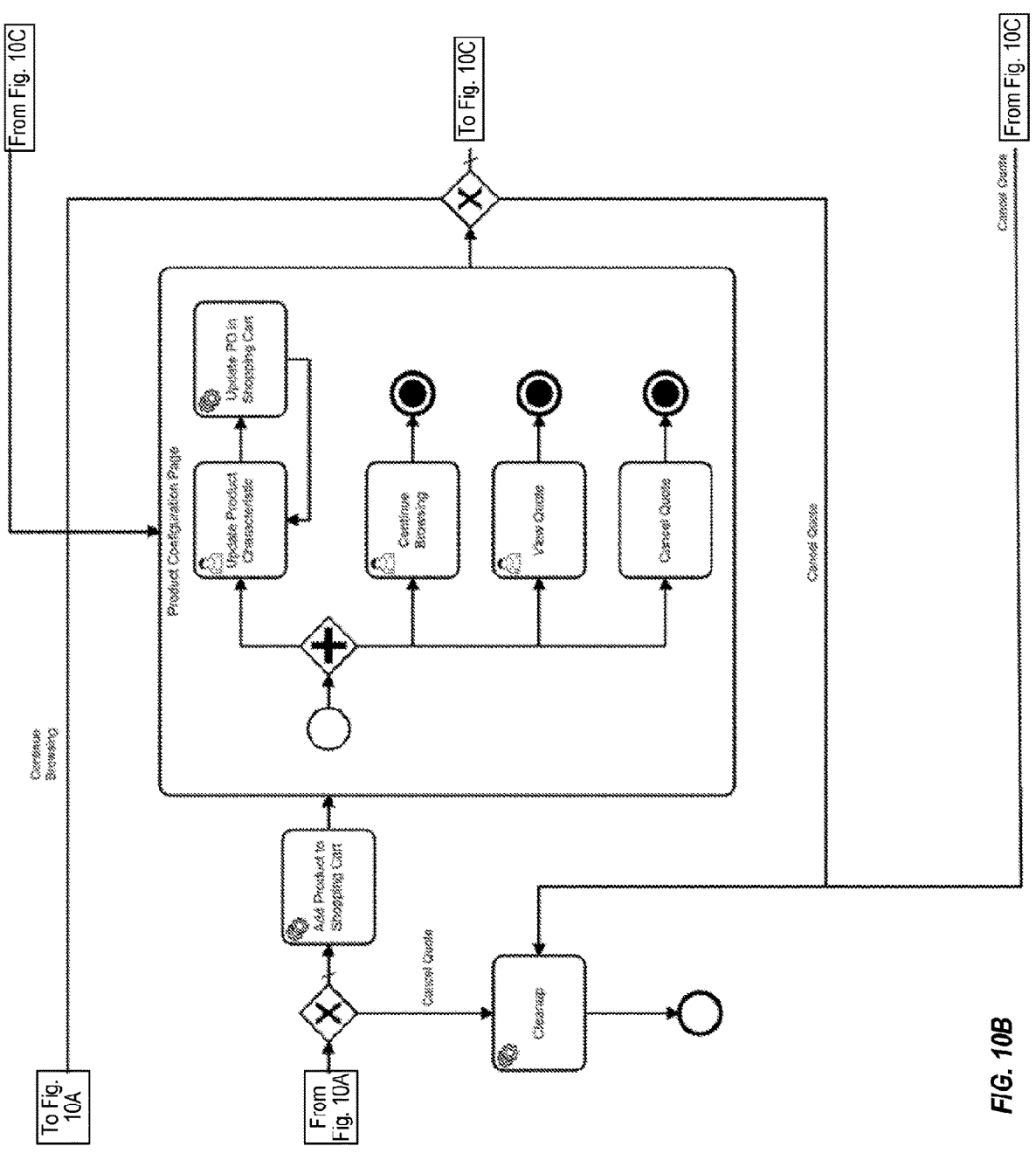
Figure 10C:
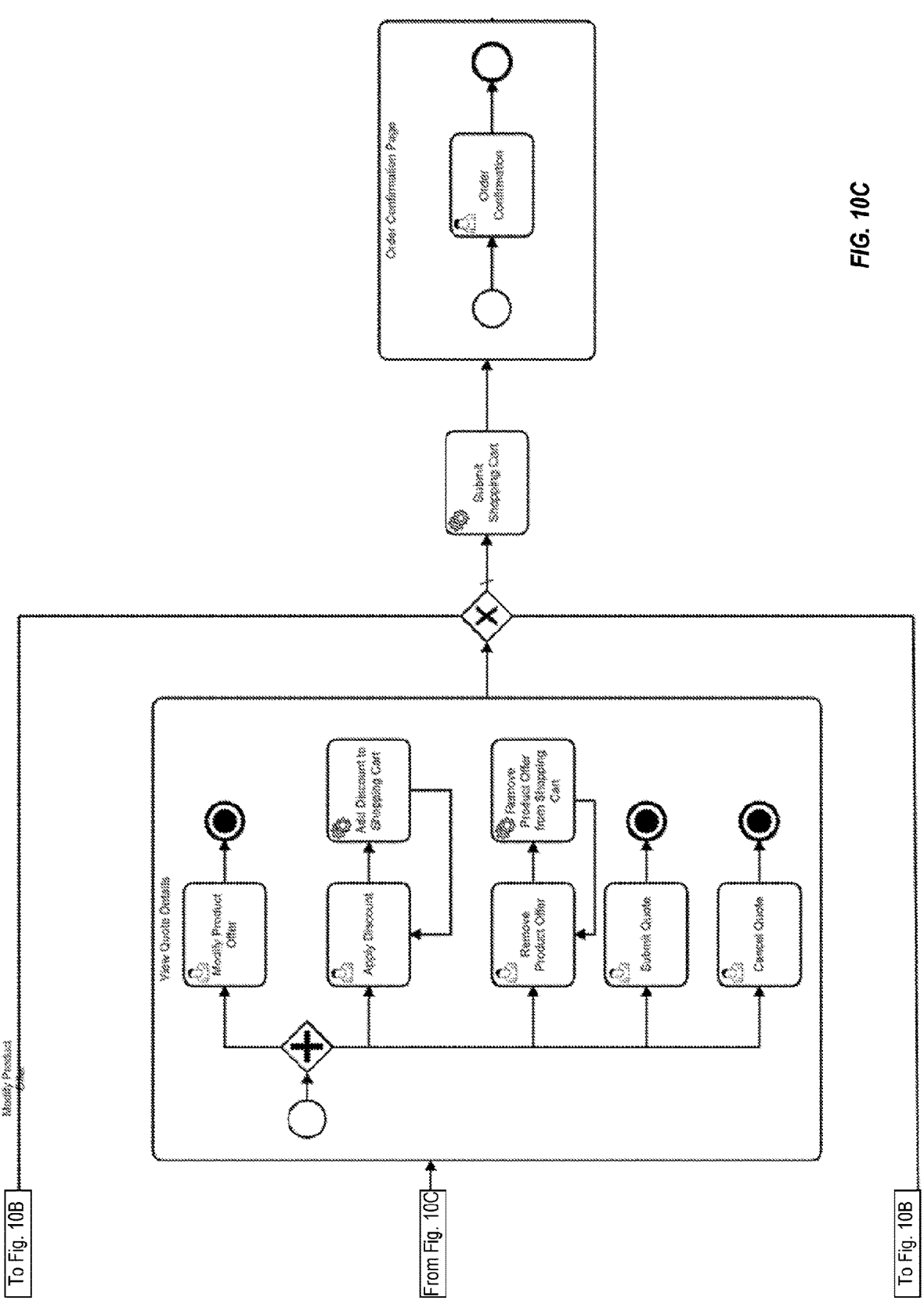

FIG. 10, which includes FIGS. 10A-C, shows a block diagram in BPMN of operations by the CPQ UI application and the flow manager of the controller application shown in FIG. 9, according to various embodiments of the present disclosure.

Figure 11:
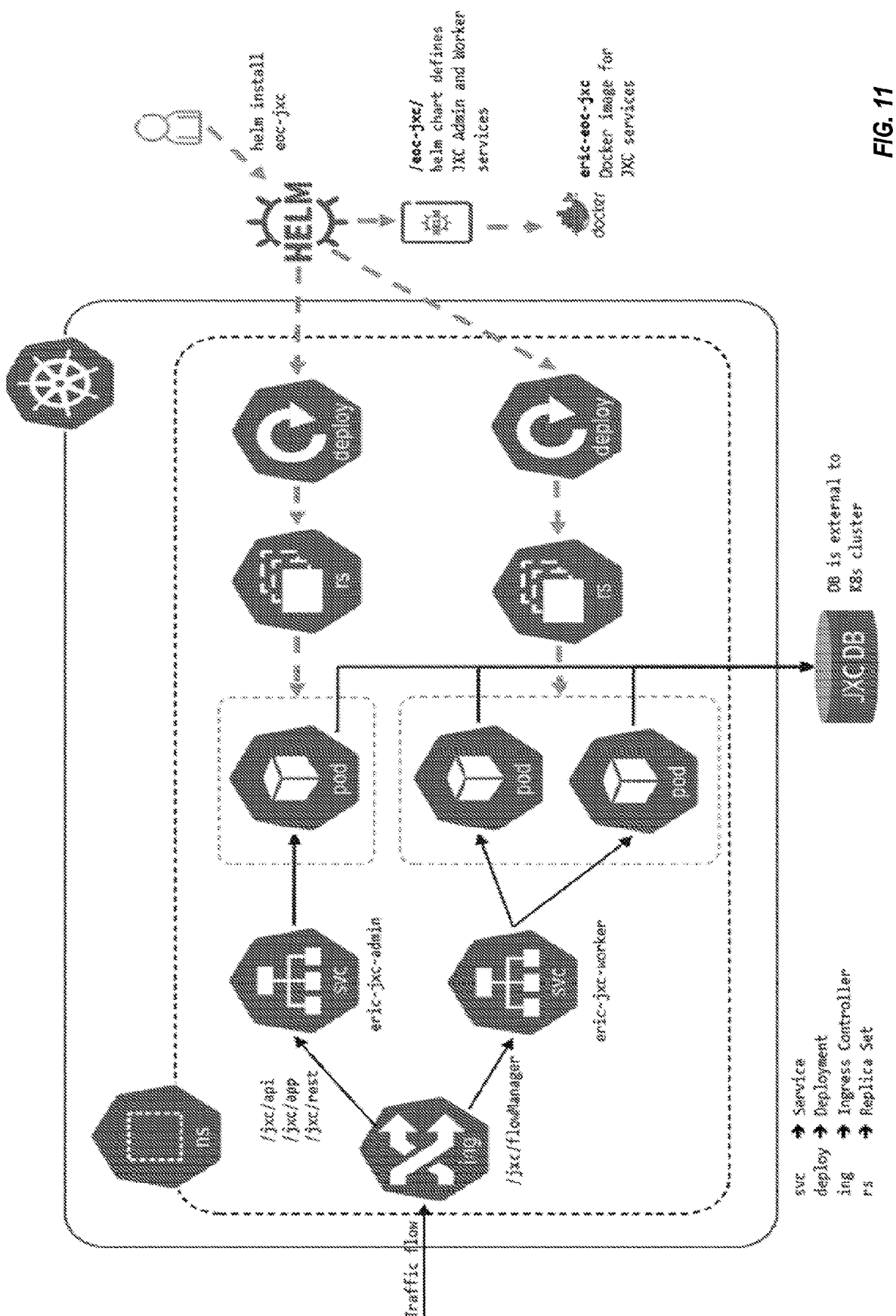
FIG. 11 illustrates an exemplary implementation of the controller application in a Kubernetes based cloud native environment.

FIG. 11 illustrates a deployment of the controller 700 (shown in FIG. 7) in a Kubernetes based cloud native environment. Kubernetes is an open-source container-orchestration system for automating computer application deployment, scaling, and management.

Figures 12, 13, 14:
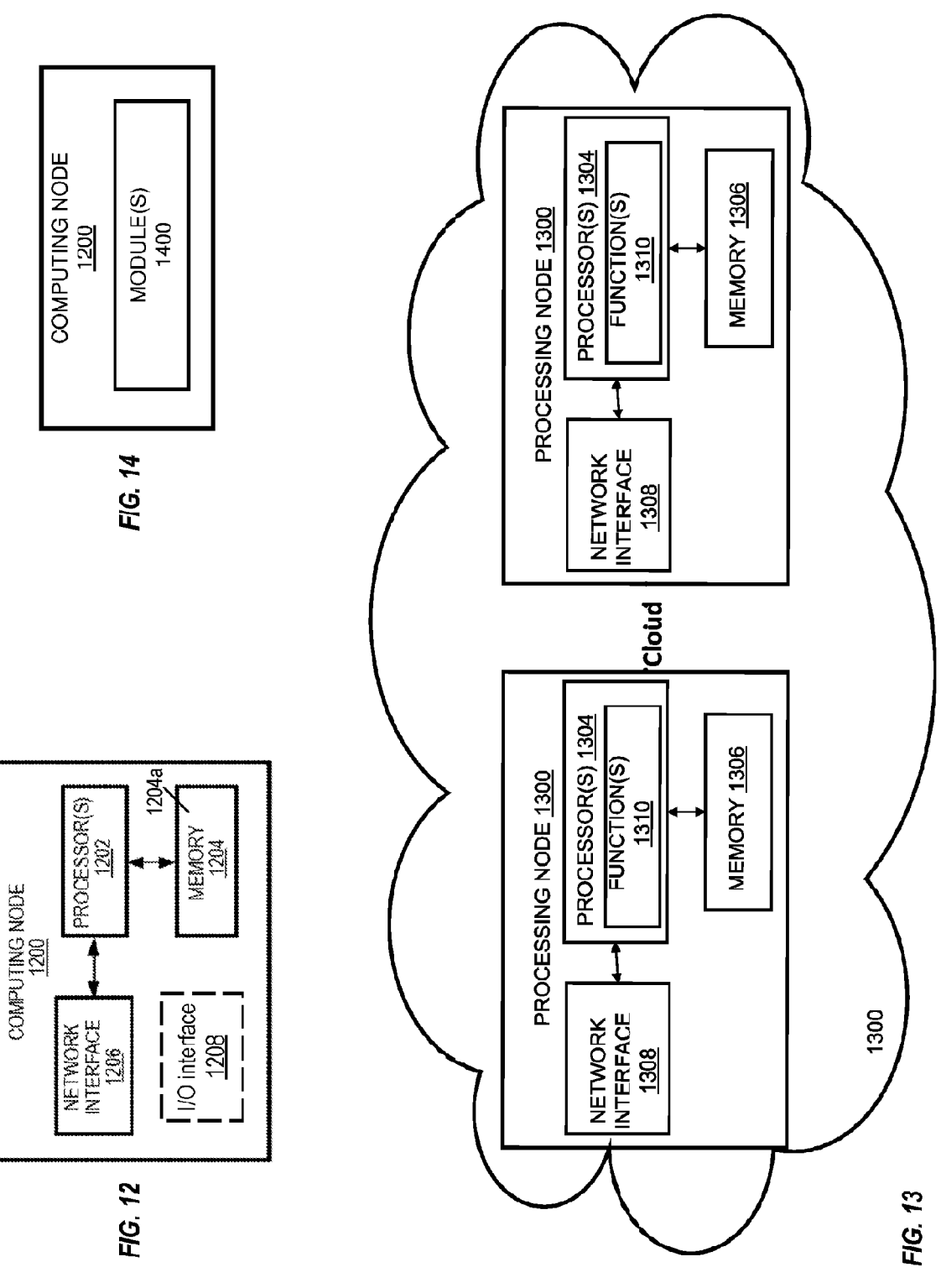
FIG. 12 is a schematic block diagram of a computing node according to various embodiments of the present disclosure.
FIG. 13 is a schematic block diagram that illustrates a virtualized embodiment of the computing node of FIG. 12 according to various embodiments of the present disclosure.
FIG. 14 is a schematic block diagram of the computing node of FIG. 12 according to various other embodiments of the present disclosure.

FIG. 12 is a schematic block diagram of a computing node 1200 according to various embodiments of the present disclosure. As illustrated, the computing node 1200 includes one or more processors 1202 (e.g., Central Processing Units (CPUs), Application Specific Integrated Circuits (ASICs), Field Programmable Gate Arrays (FPGAs), and/or the like), memory 1204, and a network interface 1206. The one or more processors 1202 are also referred to herein as process-ing circuitry, while the memory 1204 is also referred to herein as system memory.

The one or more processors 1202 operate to provide one or more functions of a computing node 1200 as described herein. In various embodiments, the computing node 1200 can perform operations corresponding to the UI application, the controller application, and/or the BPMN process engine. In various embodiments, the function(s) are implemented in software that is stored, e.g., in the memory 1204 and executed by the one or more processors 1202.

Memory 1204 can store computer program code (denoted computer program product 1204a) executable by processor(s) 1202. Such computer program code can include the UI application or the controller application described above, in various embodiments.

As one example, computing node 1200 can be a commu-nication device (e.g., a wireless communication device or user equipment) that can execute the UI application based on communication (e.g., via a wireless network) with a com-puting node (e.g., server) that executes the controller appli-cation. In such case, network interface 1206 can include a transmitter and a receiver (also known as a transceiver) that is appropriate for communication with a compatible net-work. As a specific example, network interface 1206 can include a WiFi transceiver and/or a cellular transceiver for communication with WiFi and/or cellular networks.

Additionally, when configured as a communication device in this manner, computing node 1200 can also include an input/output (I/O) interface 1208, which may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. As a specific example, I/O interface 1208 may include a display on which the UI application can render pages associated with a BPMN UI flow An input device may allow a user to capture information into computing node 1200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

FIG. 13 is a schematic block diagram that illustrates a virtualized embodiment of the computing node 1200 accord-ing to various embodiments of the present disclosure. This discussion is equally applicable to other types of computing nodes. Further, other types of computing nodes may have similar virtualized architectures.

As used herein, a "virtualized" computing node is an implementation of the computing node 1200 in which at least a portion of the functionality of the computing node 1200 is implemented as a virtual component(s) (e.g., via a virtual machine(s) executing on a physical processing node(s) in a network(s)). As illustrated, in this example, the computing node 1200 includes one or more processing nodes 1300 coupled to or included as part of a network(s) 1302. Each processing node 1300 includes one or more processors 1304 (e.g., CPUs, ASICs, FPGAS, and/or the like), memory 1306, and a network interface 1308.

In this example, functions 1310 of the computing node 1200 described herein are implemented at the one or more processing nodes 1300 or distributed across the one or more processing nodes 1300 in any desired manner. In various embodiments, some or all of the functions 1310 of the computing node 1200 described herein are implemented as virtual components executed by one or more virtual machines implemented in a virtual environment(s) hosted by the processing node(s) 700.

In various embodiments, a computer program including instructions which, when executed by at least one processor, causes the at least one processor to carry out the function-ality of computing node 1200 or a node (e.g., a processing node 1300) implementing one or more of the functions 1310 of the computing node 1200 in a virtual environment accord-ing to any of the embodiments described herein is provided.

Some embodiments include a carrier comprising and/or storing a computer program product (e.g., 1204a described above) that includes executable program code with func-tionality of any of the method embodiments described herein. The carrier can be an electronic signal, an optical signal, a radio signal, or a computer readable storage medium (e.g., a non-transitory computer readable medium such as memory).

FIG. 14 is a schematic block diagram of the computing node 1200 according to various other embodiments of the present disclosure. The computing node 1200 includes one or more modules 1400, each of which is implemented in software. The module(s) 1400 provide the functionality of the computing node 1200 described herein. This discussion is equally applicable to the processing node 1300 of FIG. 13 where the modules 1400 may be implemented at one of the processing nodes 1300 or distributed across multiple pro-cessing nodes 1300 and/or distributed across the processing node(s) 1300.

Any appropriate operations, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carry-ing out one or more of the techniques described herein. In various implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is an example (e.g., alternative embodiments may perform the operations in a different order, combine certain operations, overlap certain operations, etc.).

Various example embodiments of the present disclosure are provided below in an alphanumerically enumerated list.

E1: A method, performed by a controller application executing on a computing node, for controlling user interface (UI) transitions based on a Business Process Model and Notation (BPMN) UI flow, the method comprising:

transmitting, to a UI application communicatively coupled to the controller application, a first message including a first flow object, the first flow object including: a first page definition defining a first page for rendering by the UI application, and one or more first action definitions representing one or more first actions to be rendered within the first page;

receiving, from the UI application, a second message indicating a selected first action from among the one or more first actions; and requesting a first operation associated with a BPMN process of a BPMN engine from a service based upon the selected first action.

E2: The method of E1, wherein the transmitting of the first message is responsive to receiving a request from the UI application to instantiate a UI flow associated with the BPMN process.

E3: The method of any of E1-E2, further comprising:

transmitting, to the UI application, a third message associated with the first operation, the third message including a second flow object, the second flow object including: a second page definition defining a second page for rendering by the UI application, and one or more second action definitions representing one or more second actions to be rendered within the second page; and receiving, from the UI application, a fourth message including a selection of a selected second action from among the one or more second actions; and requesting a second operation associated with the BPMN process from the service based upon the selected second action.

E4: The method of E3, further comprising:

transmitting, to the UI application, a fifth message associated with the second operation, the fifth message including a third flow object, the third flow object including: a third page definition defining a third page for rendering by the UI application, and one or more third action definitions representing one or more third actions to be rendered within the third page.

E5: The method of any of E1-E4, wherein the BPMN engine is integrated into the controller application.

E6: The method of any of E1-E5, wherein the first flow object includes at least one of a flow identifier associated with the UI flow, a business key associated with the UI flow, a specification associated with the UI flow, a flow channel associated with the UI flow; and an actor associated with the UI flow.

E7: The method of any of E1-E6, wherein the first page definition includes a page identifier associated with the first page.

E8: The method of any of E1-E7, wherein each of the one or more first action definitions includes at least one of an identifier associated with the first action, an action definition reference associated with the first action, and possible state values associated with the first action.

E9: The method of any of E1-E8, wherein the first flow object further includes context information associated with the UI flow.

E10: The method of E9, wherein the context information includes transient context information.

E11: The method of any of E1-E10, wherein the first page definition includes an arbitrary navigation type.

E12: The method of any of E1-E10, wherein the first page definition defines a plurality of first actions available in the first page.

E13: The method of any of E1-E12, wherein the flow object further includes at least one process variable associated with the one or more first actions.

E14: The method of E13, wherein the at least one process variable includes a plurality of process variables stored in a single data container structure.

E15: The method of any of E1-14, wherein the second message is received from at least one of a voice response system or a message processing system.

E16: A computing node configured to control user interface (UI) transitions based on a Business Process Model and Notation (BPMN) UI flow, the computing node comprising:

a system memory; and processing circuitry communicatively coupled to the system memory and configured to:

transmit, to a UI application communicatively coupled to the controller application, a first message including a first flow object, the first flow object including:

a first page definition defining a first page for rendering by the UI application, and one or more first action definitions representing one or more first actions to be rendered within the first page;

receive, from the UI application, a second message indicating a selected first action from among the one or more first actions; and request a first operation associated with the BPMN process from a service based upon the selected first action.

E17: The computing node of E16, wherein the processing circuitry is further adapted to perform the method of any one of E2 to E15.

E18: A computing node configured to control user interface (UI) transitions based on a Business Process Model and Notation (BPMN) UI flow, the computing node being further configured to perform operations corresponding to any of the methods of E1-E15.

E19: A non-transitory, computer-readable medium storing computer-executable instructions that, when executed by processing circuitry associated with a computing node configured to control user interface (UI) transitions based on a Business Process Model and Notation (BPMN) UI flow, configure the computing node to perform operations corresponding to any of the methods of E1-E15.

E20: A computer program product comprising computer-executable instructions that, when executed by processing circuitry associated with a computing node configured to control user interface (UI) transitions based on a Business Process Model and Notation (BPMN) UI flow, configure the computing node to perform operations corresponding to any of the methods of E1-E15.

E21: A method, performed by a user interface (UI) application executing on a communication device, for controlling user interface (UI) transitions based on a Business Process Model and Notation (BPMN) UI flow, the method comprising:

receiving, from a controller application communicatively coupled to the UI application, a first message including a first flow object, the first flow object including: a first page definition defining a first page for rendering by the UI application, and one or more first action definitions representing one or more first actions to be rendered within the first page;

rendering the first page by the UI application; and sending, to the controller application, a second message indicating a selected first action from among the one or more first actions.

E22: The method of E21, further comprising:

receiving, from the controller application, a third message associated with a first operation associated with a BPMN process of a BPMN engine requested by the controller application from a service based on the selected first action, the third message including a second flow object, the second flow object including: a second page definition defining a second page for rendering by the UI application, and one or more second action definitions representing one or more second actions to be rendered within the second page; and transmitting, to the controller application, a fourth message including a selection of a selected second action from among the one or more second actions.

E22A: The method of E22, further comprising:

receiving, from the controller application, a fifth message associated with a second operation based on the selected second action, the fifth message including a third flow object, the third flow object including: a third page definition defining a third page for rendering by the UI application, and one or more third action definitions representing one or more third actions to be rendered within the third page.

E23: The method of any of E21-E22A, further comprising transmitting a request to the controller application to instantiate a UI flow associated with the BPMN process.

E24: The method of E23, wherein the first message is received responsive to transmitting the request.

E25: The method of any of E21-E24, wherein the first flow object includes at least one of a flow identifier associated with the UI flow, a business key associated with the UI flow, a specification associated with the UI flow, a flow channel associated with the UI flow; and an actor associated with the UI flow.

E26: The method of any of E21-E25, wherein the first page definition includes a page identifier associated with the first page.

E27: The method of any of E21-E26, wherein each of the one or more first action definitions includes at least one of an identifier associated with the first action, an action definition reference associated with the first action, and possible state values associated with the first action.

E28: The method of any of E21-E27, wherein the first flow object further includes context information associated with the UI flow.

E29: The method of E28, wherein the context information includes transient context information.

E30: The method of any of E21-E29, wherein the first page definition includes an arbitrary navigation type.

E31: The method of any of E21-E30, wherein the first page definition defines a plurality of first actions available in the first page.

E32: The method of any of E21-E31, wherein the flow object further includes at least one process variable associated with the one or more first actions.

E33: The method of E32, wherein the at least one process variable includes a plurality of process variables stored in a single data container structure.

E34: The method of any of E21-E33, wherein the communication device includes at least one of a voice response system or a message processing system.

E35: A communication device configured to execute a user interface (UI) application for controlling user interface (UI) transitions based on a Business Process Model and Notation (BPMN) UI flow, the communication device comprising:

a system memory; and processing circuitry communicatively coupled to the system memory and configured to:

receive, from a controller application communicatively coupled to the UI application, a first message including a first flow object, the first flow object including: a first page definition defining a first page for rendering by the UI application, and one or more first action definitions representing one or more first actions to be rendered within the first page;

render the first page by the UI application; and send, to the controller application, a second message indicating a selected first action from among the one or more first actions.

E36: The communication device of E35, wherein the processing circuitry is further configured to perform the method of any one of E21 to E34.

E37: A communication device configured to control user interface (UI) transitions based on a Business Process Model and Notation (BPMN) UI flow, the communication device being further configured to perform operations corresponding to any of the methods of E21-E34.

E38: A non-transitory, computer-readable medium storing computer-executable instructions that, when executed by processing circuitry associated with a communication device configured to control user interface (UI) transitions based on a Business Process Model and Notation (BPMN) UI flow, configure the communication device to perform operations corresponding to any of the methods of E21-E34.

E39: A computer program product comprising computer-executable instructions that, when executed by processing circuitry associated with a communication device configured to control user interface (UI) transitions based on a Business Process Model and Notation (BPMN) UI flow, configure the communication device to perform operations corresponding to any of the methods of E21-E34.

The invention claimed is:

1. A method, performed by a controller application executing on a computing node, for controlling user interface (UI) transitions based on a Business Process Model and Notation (BPMN) UI flow, the method comprising:

transmitting, by the controller application to a UI application operating on a communication device, a first message including a first flow object of the BPMN UI flow, wherein the first flow object includes the following:

a first page definition defining a first page for rendering by the UI application, and one or more first action definitions representing one or more first actions to be rendered within the first page;

receiving, by the controller application from the UI application, a second message indicating a selected one of the first actions; and based upon the selected first action, requesting by the controller application a first operation of the BPMN UI flow from an external service.

2. The method of claim 1, further comprising:

transmitting, by the controller application to the UI application, a third message associated with the first operation, wherein the third message including a second flow object of the BPMN UI flow, wherein the second flow object includes the following:

a second page definition defining a second page for rendering by the UI application, and one or more second action definitions representing one or more second actions to be rendered within the second page; and receiving, by the controller application from the UI application, a fourth message indicating a selected one of the second actions; and based on the selected second action, requesting by the controller application a second operation of the BPMN UI flow from the external service.

3. The method of claim 2, wherein the external service is a shopping cart service, the first operation creates a user shopping cart with the shopping cart service, and the second operation adds a user-selected item to the user shopping cart.

4. The method of claim 2, further comprising transmitting, by the controller application to the UI application, a fifth message associated with the second operation, wherein the fifth message includes a third flow object of the BPMN UI flow, and wherein the third flow object includes the following:

a third page definition defining a third page for rendering by the UI application, and one or more third action definitions representing one or more third actions to be rendered within the third page.

5. The method of claim 1, wherein requesting the first operation from the external service is performed by a BPMN process engine that is integrated with the controller application.

6. The method of claim 1, wherein the first flow object includes or identifies at least one of the following associated with the BPMN UI flow: a flow identifier, a business key, a specification, a flow channel, an actor, persistent context information, and transient context information.

7. The method of claim 1, wherein each of the one or more first action definitions includes at least one of the following associated with the first action: an identifier, an action definition reference, and possible state values.

8. The method of claim 1, wherein one of the following applies:

the first page definition includes an arbitrary navigation type; or the first page definition defines a plurality of first actions available in the first page.

9. The method of claim 1, wherein the first flow object also includes a plurality of process variables associated with the one or more first actions, with the plurality of process variables being included in a single data container structure.

10. The method of claim 1, wherein the UI application is associated with one of the following: a voice response system; a message processing system; or a web graphical user interface (GUI).

11. A computing node configured to control user interface (UI) transitions based on a Business Process Model and Notation (BPMN) UI flow, the computing node comprising:

computer memory storing program code that includes a controller application; and processing circuitry operatively coupled to the system memory, wherein execution of the program code by the processing circuitry configures the computing node to:

transmit, by the controller application to a UI application operating on a communication device, a first message including a first flow object of the BPMN UI flow, wherein the first flow object includes the following:

a first page definition defining a first page for rendering by the UI application, and one or more first action definitions representing one or more first actions to be rendered within the first page;

receive, by the controller application from the UI application, a second message indicating a selected one of the first actions; and based upon the selected first action, request by the controller application a first operation of the BPMN UI flow from an external service.

12. A method, performed by a user interface (UI) application executing on a communication device, for controlling UI transitions based on a Business Process Model and Notation (BPMN) UI flow, the method comprising:

receiving, from a controller application operating on a computing node, a first message including a first flow object of the BPMN UI flow, wherein the first flow object includes the following:

a first page definition defining a first page for rendering by the UI application, and one or more first action definitions representing one or more first actions to be rendered within the first page;

rendering the first page on a display of the communication device; and transmitting, to the controller application, a second message indicating a selected one of the first actions.

13. The method of claim 12, further comprising:

receiving, from the controller application, a third message associated with a first operation of the BPMN UI flow provided by an external service based on the selected first action, wherein the third message including a second flow object of the BPMN UI flow, wherein the second flow object includes the following:

a second page definition defining a second page for rendering by the UI application, and one or more second action definitions representing one or more second actions to be rendered within the second page; and rendering the second page on the display of the communication device; and transmitting, to the controller application, a fourth message indicating a selected one of the second actions.

14. The method of claim 13, wherein the external service is a shopping cart service, the first operation creates a user shopping cart with the shopping cart service, and the selected second action adds a user-selected item to the user shopping cart.

15. The method of claim 13, further comprising receiving, from the controller application, a fifth message associated with a second operation of the BPMN UI flow provided by the external service based on the selected second action, wherein the fifth message includes a third flow object of the BPMN UI flow, wherein the third flow object includes the following:

a third page definition defining a third page for rendering by the UI application, and one or more third action definitions representing one or more third actions to be rendered within the third page.

16. The method of claim 12, wherein the first flow object includes or identifies at least one of the following associated with the BPMN UI flow: a flow identifier, a business key, a specification, a flow channel, an actor, persistent context information, and transient context information.

17. The method of claim 12, wherein each of the one or more first action definitions includes at least one of the following associated with the first action: an identifier, an action definition reference, and possible state values.

18. The method of claim 12, wherein one of the following applies:

the first page definition includes an arbitrary navigation type; or the first page definition defines a plurality of first actions available in the first page.

19. The method of claim 12, wherein the flow object also includes a plurality of process variables associated with the one or more first actions, with the plurality of process variables being included in a single data container structure.

20. The method of claim 12, wherein the UI application is associated with one of the following: a voice response system; a message processing system; or a web graphical user interface (GUI).

21. A communication device configured with a user interface (UI) application arranged to control UI transitions based on a Business Process Model and Notation (BPMN) UI flow, the communication device comprising:

a display;

computer memory storing program code including the UI application; and processing circuitry operatively coupled to the display and the computer memory, wherein execution of the program code by the processing circuitry configures the communication device to:

receive, by the UI application from a controller application operating on the computing node, a first message including a first flow object of the BPMN UI flow, wherein the first flow object includes the following:

a first page definition defining a first page for rendering by the UI application, and one or more first action definitions representing one or more first actions to be rendered within the first page;

render, by the UI application, the first page on the display; and send, by the UI application to the controller application, a second message indicating a selected one of the first actions.

* * * * *